(12) United States Patent
Sasada

(10) Patent No.: US 7,955,666 B2
(45) Date of Patent: Jun. 7, 2011

(54) CELLULOSE ACYLATE FILM AND METHOD FOR PRODUCING SAME, AND RETARDATION FILM, POLARIZING PLATE AND LIQUID CRYSTAL DISPLAY DEVICE COMPRISING THE FILM

(75) Inventor: Yasuyuki Sasada, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1055 days.

(21) Appl. No.: 11/798,851

(22) Filed: May 17, 2007

(65) Prior Publication Data
US 2007/0275187 A1   Nov. 29, 2007

(30) Foreign Application Priority Data
May 18, 2006   (JP) .................................. 2006-139566

(51) Int. Cl.
*C09K 19/00*   (2006.01)
*C08B 3/00*   (2006.01)

(52) U.S. Cl. ......................... 428/1.33; 428/1.54; 536/58

(58) Field of Classification Search ....................... None
See application file for complete search history.

(56) References Cited

U.S. PATENT DOCUMENTS

| | | | |
|---|---|---|---|
| 3,498,741 A | 3/1970 | Riley | |
| 3,608,059 A | 9/1971 | Dotson et al. | |
| 5,977,347 A | 11/1999 | Shuto et al. | |
| 2002/0162483 A1 | 11/2002 | Shimizu et al. | |
| 2004/0022965 A1* | 2/2004 | Sakamaki et al. | 428/1.31 |
| 2004/0247918 A1 | 12/2004 | Hashimoto | |
| 2005/0058781 A1* | 3/2005 | Hayashi et al. | 428/1.3 |
| 2006/0062934 A1* | 3/2006 | Hayashi et al. | 428/1.31 |
| 2006/0066787 A1* | 3/2006 | Yoda et al. | 349/119 |
| 2006/0182896 A1* | 8/2006 | Murakami et al. | 428/1.1 |
| 2006/0216439 A1* | 9/2006 | Shimizu et al. | 428/1.31 |
| 2006/0222786 A1* | 10/2006 | Oya et al. | 428/1.31 |
| 2006/0246231 A1* | 11/2006 | Koishi et al. | 428/1.3 |
| 2007/0269617 A1 | 11/2007 | Sasada | |
| 2007/0275188 A1 | 11/2007 | Sasada | |
| 2009/0136690 A1* | 5/2009 | Sasada | 428/1.31 |
| 2009/0202751 A1* | 8/2009 | Sasada | 428/1.31 |

FOREIGN PATENT DOCUMENTS

| | | |
|---|---|---|
| JP | 5-157911 A | 6/1993 |
| JP | 2000-231016 A | 8/2000 |
| JP | 2002-127244 A | 5/2002 |
| JP | 2003-014933 A | 1/2003 |
| JP | 2004-243628 A | 9/2004 |
| JP | 2005-22087 A | 1/2005 |
| JP | 2005-330411 A | 12/2005 |
| JP | 2006-030937 A | 2/2006 |
| WO | 2006/030954 A1 | 3/2006 |

* cited by examiner

*Primary Examiner* — Angela Ortiz
*Assistant Examiner* — Nicole T Gugliotta
(74) *Attorney, Agent, or Firm* — Buchanan Ingersoll & Rooney PC

(57) ABSTRACT

A Cellulose acylate film, in which X-ray diffraction intensity satisfies following formulae and a half-value width of the peak at $2\theta_2$ is 3° or less:

$$0.40 \leq Ic/(Iam+Ic) \leq 0.85;$$

$$Iam = I_1 + \{(I_3 - I_1)/(2\theta_3 - 2\theta_1) \times (2\theta_2 - 2\theta_1)\}; \text{ and}$$

$$Ic = I_2 - Iam,$$

wherein when it is assumed that $\theta$ is the Bragg angle, $2\theta_1$ and $2\theta_3$ indicate $2\theta$ at which the intensity becomes the minimum in the $2\theta$ range of 4° to 5° and 14° to 16°, respectively, $2\theta_2$ indicates $2\theta$ at which the intensity becomes the maximum in the $2\theta$ range of 5° to 10°, and $I_1$, $I_2$ and $I_3$ indicate a diffractive intensity at $2\theta_1$, $2\theta_2$ and $2\theta_3$, respectively.

11 Claims, 1 Drawing Sheet

CELLULOSE ACYLATE FILM AND METHOD FOR PRODUCING SAME, AND RETARDATION FILM, POLARIZING PLATE AND LIQUID CRYSTAL DISPLAY DEVICE COMPRISING THE FILM

BACKGROUND OF THE INVENTION

1. Field of the Invention

The present invention relates to a cellulose acylate film having optical anisotropy and capable of being directly stuck to a polarizing film, and a method for producing thereof, and to a retardation film, a polarizer, and a liquid crystal device using the cellulose acylate film.

2. Description of the Related Art

A polymer film of typically cellulose ester, polyester, polycarbonate, cyclo-olefin polymer, vinyl polymer or polyimide is used in silver halide photographic materials, retardation films, polarizers and image display devices. Films that are more excellent in point of the surface smoothness and the uniformity can be produced from these polymers, and the polymers are therefore widely employed for optical films.

Of those, cellulose ester films having suitable moisture permeability can be directly stuck to most popular polarizing films formed of polyvinyl alcohol (PVA)/iodine in on-line operation. Accordingly, cellulose acylate, especially cellulose acetate is widely employed as a protective film for polarizers.

On the other hand, when cellulose acylate film is applied to optical use, for example, in retardation films, supports for retardation films, protective films for polarizers and liquid crystal display devices, the control of their optical anisotropy is an extremely important element in determining the performance (e.g., visibility) of display devices. With the recent demand for broadening the viewing angle of liquid crystal display devices, improvement of retardation compensation in the devices is desired, for which it is desired to suitably control the in-plane retardation Re (this may be simply referred to as Re) and the thickness-direction retardation Rth (this may be simply referred to as Rth) of the retardation film to be disposed between a polarizing film and a liquid crystal cell. In addition, it is desired to control properly not only optical characteristics of the film but also physical characteristics of the film.

As a method of manufacturing the film having these optical properties, for example, methods of extending the film in a longitudinal direction or a transverse direction (see JP-A-2002-127244 and JP-A-2004-243628 for reference), sequentially extending the film in two axes (see JP-A-2005-330411 for reference), simultaneously extending the film in two axes (see JP-A-2005-22087 for reference), and extending the film in a thickness direction thereof (see JP-A-5-157911 and JP-A-2000-231016 for reference) are disclosed. However, in the film manufactured by these methods, there are problems that a balance control between Re and Rth is not enough and both of the optical property and the dynamic property of matter of the film are not improved.

SUMMARY OF THE INVENTION

An object of the invention is to provide a cellulous acylate film in which both of the optical property and the dynamic property of matter are improved and a method of manufacturing the same. In addition, another object of the invention is to provide a cellulous acylate film and a method of manufacturing the same which have larger Re. Further, another object of the invention is to provide a retardation film using the cellulous acylate film according to the invention and a polarizing plate having an excellent optical property by directly adhering the cellulous acylate film according to the invention, which serves as a retardation film, a supporter of the retardation film, or a protective film of the polarizing plate, to a polarizing film. Further, the other object of the invention is to provide a liquid crystal display device having high reliability.

The above-mentioned problem can be solved by the following means.

(1) A cellulous acylate film in which X-ray diffractive intensity satisfies the following Formulae (I) to (III) and in which a half-value width of the peak at $2\theta_2$ is 3° or less.

$$0.40 \leq Ic/(Iam+Ic) \leq 0.85; \quad \text{Formula (I)}$$

$$Iam = I_1 + \{(I_3-I_1)/(2\theta_3-2\theta_1)\} \times (2\theta_2-2\theta_1)\}; \quad \text{Formula (II)}$$

$$Ic = I_2 - Iam; \quad \text{Formula (III)}$$

wherein when it is assumed that $\theta$ is the Bragg angle, $2\theta_1$ indicates $2\theta$ at which the intensity becomes the minimum in the $2\theta$ range of 4° to 5°, $2\theta_2$ indicates $2\theta$ at which the intensity becomes the maximum in the $2\theta$ range of 5° to 10°, $2\theta_3$ indicates $2\theta$ at which the intensity becomes the minimum in the $2\theta$ range of 14° to 16°, $I_1$ indicates a diffractive intensity at $2\theta_1$, $I_2$ indicates a diffractive intensity at $2\theta_2$, and $I_3$ indicates a diffractive intensity at $2\theta_3$.

(1-2) The cellulose acylate film according to (1), wherein there exists at least one peak in the $2\theta$ range between $2\theta_2$ and $2\theta_3$, the maximum peak in the $2\theta$ range between $2\theta_2$ and $2\theta_3$ exists at $2\theta_4$ in the $2\theta$ range of 10° to 12.5°, and a half-value width of the peak at $2\theta_4$ is less than 2°.

(2) The cellulous acylate film according to (1) or (1-2), wherein the film satisfies the following Formula (IV):

$$Ic_1/Ic_2 > 50. \quad \text{Formula (IV)}$$

wherein when it is assumed that $Ic_1$ indicate Ic in a direction in which $I_2$ becomes the maximum and $Ic_2$ indicate Ic in a direction perpendicular thereto.

(3) The cellulous acylate film according to any one of (1) to (2), wherein the haze is 3% or less.

(3-2) The cellulous acylate film according to any one of (1) to (3), wherein an angle formed by the direction of obatained $Ic_1$ and a direction in which a sound-wave propagation velocity becomes the maximum is in the range of 75° to 105°.

(4) The cellulous acylate film according to any one of (1) to (3-2), wherein the in-plane retardation is in the range of 5 to 600 nm.

(5) The cellulous acylate film according to any one of (1) to (4), wherein an angle formed by a direction of an in-plane slow-phase axis and a direction in which a sound-wave propagation velocity becomes the maximum is in the range of 75° to 105°.

(5-2) The cellulous acylate film according to any one of (1) to (5), wherein a fluctuation angle of direction of a slow-phase axis is less than 5°.

(6) The method for producing a cellulose acylate film comprising:

heating a cellulose acylate film at a temperature not less than $(-285 \times S+1000)°$ C. and less than a melting point of the cellulose acylate film for 0.01 minutes to less than 60 minutes wherein S represents a total substitution degree of the cellulose acylate film; and contracting the cellulose acylate film in a width direction thereof at the time of the heating process.

(6-2) A method for producing a cellulose acylate film comprising:

heating a cellulose acylate film at a temperature not less than Tc and less than a melting point of the cellulose acylate film for 0.01 minutes to less than 60 minutes wherein Tc represents a crystallization temperature of the cellulose acylate film before the heating and S represents a total substitution degree of the cellulose acylate film; and contracting the cellulose acylate film in a width direction thereof at the time of the heating process.

(7) The method of manufacturing a cellulous acylate film according to (6) or (6-2), wherein a contraction ratio of the film in the width 25 direction is in the range of 5% to 80%.

(7-2) The method of manufacturing a cellulous acylate film according to any one of (6) to (7), wherein an angle formed by a direction of in-plane slow-phase axis of the film and a transport direction is in the range of 80° to 100°.

(8) A cellulous acylate film manufactured by the method according to any one of (6) to (7-2).

(9) The cellulous acylate film according to any one of (1) to (5-2) and (8), wherein an angle formed by a direction of in-plane slow-phase axis of the film and a transport direction is in the range of 80° to 100°.

(10) A retardation film having at least one sheet of cellulous acylate film according to any one of (1) to (5-2), (8), and (9).

(11) A polarizing plate having at least one sheet of cellulous acylate film according to any one of (1) to (5-2), (8), and (9).

(12) The polarizing plate according to (11), wherein the cellulous acylate film is directly adhered to a polarizing film.

(13) A liquid crystal display device having at least one sheet of the cellulose acylate film according to any one of (1) to (5-2), (8), and (9), the retardation film according to (10), and the polarizing film according to (11) or (12).

According to the invention, since the cellulous acylate film which improves both of the optical property and the dynamic property of matter and the method of manufacturing the same are provided, it is possible to provide the excellent retardation film. In addition, it is possible to provide the cellulous acylate film having larger Re and the method of manufacturing the same. The cellulous acylate film of the invention having this retardation may be used as the retardation film itself and the retardation film having large Re. Further, since the cellulous acylate film according to the invention has proper moisture permeability, the film may be adhered to the polarizing film on line. Accordingly, the polarizing plate having excellent visibility and high productivity may be provided. In addition, the liquid crystal display device having high reliability may be provided.

BEST MODE FOR CARRYING OUT THE INVENTION

Figure 1:
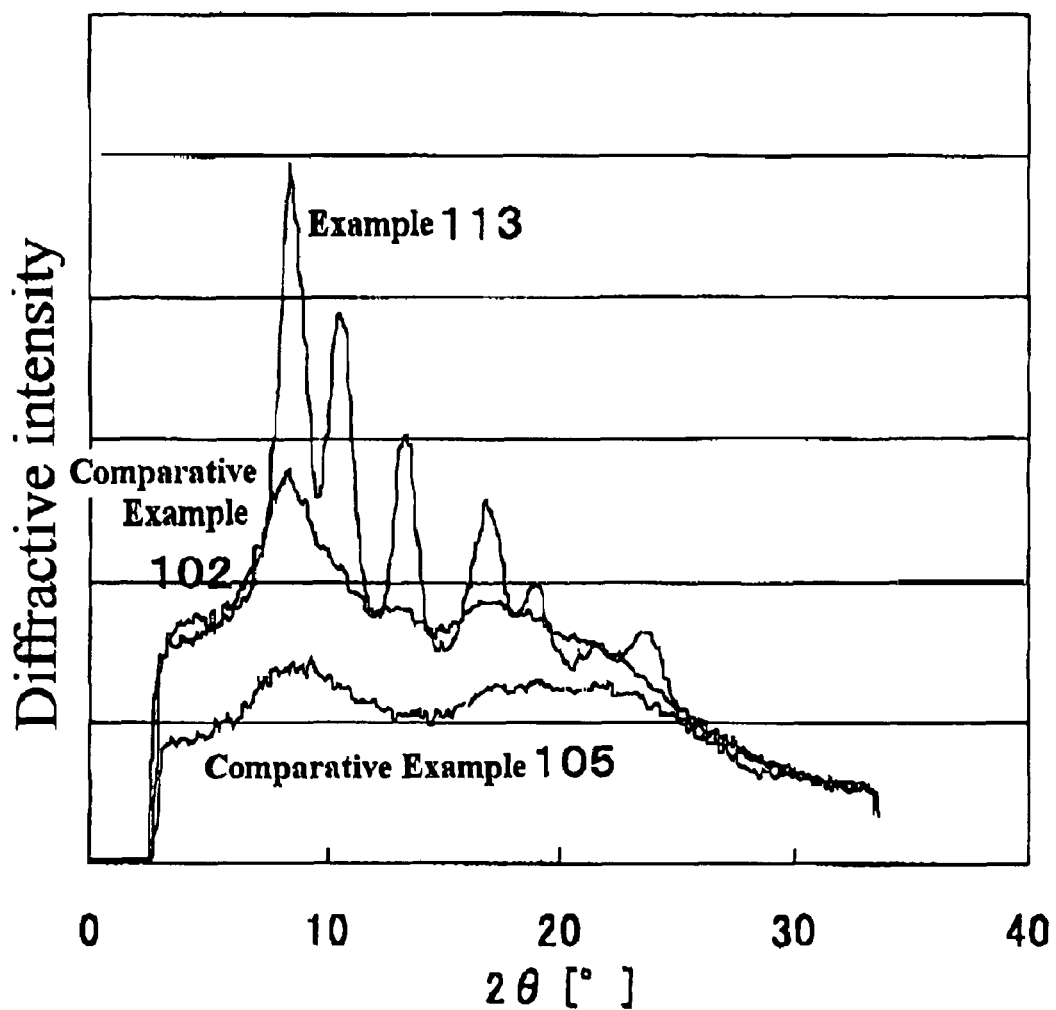
FIG. 1 shows diffraction profile in a direction in which the peak intensity in the 2θ range of 5° to 10° becomes the maximum in Example 113 and Comparative Examples 102 and 105.

Described in detail hereinafter are the cellulose acylate film and the method for producing it, the retardation film, the polarizer and the liquid crystal display device of the invention. The constituent features may be described below on the basis of representative embodiments of the invention, but the invention is not limited to such embodiments. The numerical range represented by "-" herein means a range including the numerical values described before and after "-" as the lowermost value and the uppermost value, respectively.

<Cellulous Acylate Film>

In a cellulous acylate film according to the invention, X-ray diffractive intensity satisfies the following Formulae (I) to (III) and a half-value width of the peak at $2\theta_2$ is 3° or less.

By appropriately controlling the X-ray diffractive intensity as described below, the cellulous acylate film of the invention can improve both of the optical property and the dynamic property of matter.

$$0.40 \leq Ic/(Iam+Ic) \leq 0.85; \quad \text{Formula (I)}$$

$$Iam = I_1 + \{(I_3-I_1)/(2\theta_3-2\theta_1)\} \times (2\theta_2-2\theta_1)\}; \quad \text{Formula (II)}$$

$$Ic = I_2 - Iam; \quad \text{Formula (III)}$$

wherein when it is assumed that θ is the Bragg angle, $2\theta_1$ indicates 2θ at which the intensity becomes the minimum in the 2θ range of 4° to 5°, $2\theta_2$ indicates 2θ at which the intensity becomes the maximum in the 2θ range of 5° to 10°, $2\theta_3$ indicates 2θ at which the intensity becomes the minimum in the 2θ range of 14° to 16°, $I_1$ indicates a diffractive intensity at $2\theta_1$, $I_2$ indicates a diffractive intensity at $2\theta_2$, and $I_3$ indicates a diffractive intensity at $2\theta_3$.

[X-ray Diffractive Intensity]

According to the invention, the X-ray diffractive intensity of the cellulous acylate film was obtained (Cu Kα ray 50 kV, 200 mA, 10 minutes) from a diffraction picture of a beam transmitted by adjusting humidity of the film at 25° C. at relative humidity of 60% for 24 hours and then using an automatic X-ray diffracting device (RINT 2000: manufactured by Rigaku Corporation.) and a general-purpose imaging-plate reading device (R-AXIS DS3C/3 CL). Diffraction profiles were evaluated in the whole direction from the obtained diffraction picture. Iam and Ic were evaluated from the diffraction profiles in a direction in which peak intensity becomes the maximum in the 2θ range of 5° to 10° in accordance with Formulae (II) and (III). But, a part where a beam is removed by a beam stopper is not interpreted when the $2\theta_1$ is evaluated. In the invention, peak positions are expressed by 2θ at the top (maximum) of the peak.

$$Iam = I_1 + \{(I_3-I_1)/(2\theta_3-2\theta_1)\} \times (2\theta_2-2\theta_1)\}; \quad \text{Formula (II)}$$

$$Ic = I_2 - Iam; \quad \text{Formula (III)}$$

wherein when it is assumed that θ is the Bragg angle, $2\theta_1$ indicates 2θ at which the intensity becomes the minimum in the 2θ range of 4° to 5°, $2\theta_2$ indicates 2θ at which the intensity becomes the maximum in the 2θ range of 5° to 10°, $2\theta_3$ indicates 2θ at which the intensity becomes the minimum in the 2θ range of 14° to 16°, $I_1$ indicates a diffractive intensity at $2\theta_1$, $I_2$ indicates a diffractive intensity at $2\theta_2$, and $I_3$ indicates a diffractive intensity at $2\theta_3$.

In the cellulous acylate film according to the invention, it is preferable that the Iam and Ic evaluated as observed in the sectional view in the same direction as the transport direction of the film satisfy the following Formula (I). By allowing Ic/(Iam+Ic) to be in 0.40 or more, the directional property of the optical property and the dynamic property of matter may be preferable. By allowing Ic/(Iam+Ic) to be in 0.85 or less, it can effectively prevent the film from weakening.

$$0.40 \leq Ic/(Iam+Ic) \leq 0.85. \quad \text{Formula (I)}$$

It is more preferable that Formula (VI) satisfies the following Formula (Ia):

$$0.45 \leq Ic/(Iam+Ic) \leq 0.80. \quad \text{Formula (Ia)}$$

It is further more preferable that Formula (I) satisfies the following Formula (Ib):

$$0.50 \leq Ic/(Iam+Ic) \leq 0.75. \qquad \text{Formula (Ib)}$$

In the cellulous acylate film of the invention, a half-value width of the peak at $2\theta_2$ observed in the sectional view in the same direction as the transport direction of the film is 3° or less, preferably in the range of 0.5° to 2.5°, and more preferably in the range of 0.7° to 2°.

The cellulose acylate film of the invention preferably has at least one peak in the 2θ range between $2\theta_2$ and $2\theta_3$ in which the maximum peak in the 2θ range between $2\theta_2$ and $2\theta_3$ exists in the 2θ range of 10° to 12.5° ($2\theta_4$) and a half-value width of the peak at $2\theta_4$ is less than 2°. The peak at $2\theta_4$ is not generally detected in conventional cellulose acylate films and therefore they cannot attain desired optical properties. In these conventional films, a half-value width of the peak at $2\theta_4$ cannot be defined. The cellulose acylate film of the invention shows more desired optical properties when it is controlled to have a peak at $2\theta_4$ between 10° and 12.5° and a half-value width of the peak at $2\theta_4$ of less than 2°.

In the cellulose acylate film of the invention, there preferably exist two peaks between $2\theta_2$ and $2\theta_3$. The half-value width of the peak at $2\theta_4$ is preferably in the range of 0.5° to 1.8°, more preferably in the range of 0.7° to 1.5°.

When there exist two peaks between $2\theta_2$ and $2\theta_3$ and one is at $2\theta_4$ and the other is at $2\theta_5$, the peak at $2\theta_5$ is preferably in the 2θ range of 12.5° to 14°.

It is preferable that the cellulose acylate film according to the invention satisfies Formula (IV), where $Ic_1$ is Ic in a direction in which the peak intensity in the 2θ range of 5° to 10° becomes the maximum, and $Ic_2$ is Ic in a direction perpendicular to the direction in which the peak intensity is the maximum:

$$Ic_1/Ic_2 > 50 \qquad \text{Formula (IV)}$$

By satisfying the requirement, there is an advantage of being able to express the retardation in the plane substantially.

It is more preferable that the cellulose acylate film according to the invention satisfies Formula (IVa):

$$80 < I_{C1}/I_{C2} < 10000 \qquad \text{Formula (IVa)}$$

It is more preferable that the cellulose acylate film according to the invention satisfies Formula (IVb):

$$110 < I_{C1}/I_{C2} < 1000 \qquad \text{Formula (IVb)}$$

The angle between a direction in which the $I_{C1}$ is obtained and a direction in which the sound-wave propagation velocity is the maximum is preferably in the range of 75° to 105°, more preferably in the range of 80° to 100°, even more preferably in the range of 85° to 95°, preferably in the range of 87° to 93° on a case-by-case basis, most preferably in the range of 89° to 91°. By satisfying the requirement, there is an advantage of being able to suppress the reduction in polarization degree even when the hygrothermal environment is changed repeatedly.

According the invention, the variation of the slow-phase axis is preferably 5° or less, and more preferably 2° or less. By satisfying the requirement, there is an advantage of being able to reduce display unevenness in a liquid crystal display device.

[Haze]

According to the invention, the haze of the cellulous acylate film was measured by adjusting the humidity of the film at 25° at relative humidity of 60% for 24 hours and then using a haze-meter (NDH 2000: manufactured by NIPPON DENSHOKU KOGYO KABUSHIKI KAISHA).

In general, a haze value of a polymer film increases depending on the increase in X-ray diffractive intensity. However, it is preferable that the haze value is low in the film used for an optical film such as a liquid crystal display device like the invention. The circumstance can be realized in the way to appropriately adjust the peak at $2\theta_2$ and $2\theta_4$ in the above-described X-ray diffraction profiles. It is preferable that the haze of the cellulose acylate film according to the invention is 3% or less, more preferable in the range of 0.0% to 2.0%, further more preferable in the range of 0.1% to 1.0%, and the most preferable in the range of 0.1% to 0.5%.

[Sound-Wave Propagation Velocity (Acoustic Velocity)]

In order to achieve the cellulous acylate film of the invention improving both of the optical property and the dynamic property of matter, as described below, it is preferable to control a direction of an in-plane slow-phase axis and a direction in which the sound-wave propagation velocity (hereinafter, referred to as "sound velocity") becomes the maximum.

The direction in which the sound-wave propagation velocity becomes the maximum was evaluated, as a direction in which a propagation velocity of a longitudinal-wave vibrations of ultrasonic pulse becomes the maximum, by adjusting humidity of the film at 25° C. at relative humidity of 60% for 24 hours and then using an alignment-property meter (SST-2500: manufactured by Nomura Shoji Co., Ltd.).

[Retardation]

The retardation in the invention is described. In this description, Re and Rth (unit: nm) are obtained according to the following method. A film to be analyzed is conditioned at 25° C. and a relative humidity of 60% for 24 hours. Using a prism coupler (Model 2010 Prism Coupler, by Metricon) and using a solid laser at 532 nm, the mean refractivity (n) of the film, which is represented by the following formula (a), is obtained at 25° C. and a relative humidity of 60%.

$$n = (n_{TE} \times 2 + n_{TM})/3 \qquad (a)$$

wherein $n_{TE}$ is the refractive index measured with polarizing light in the in-plane direction of the film; and $n_{TM}$ is the refractive index measured with polarizing light in the normal direction to the face of the film.

Re(λ) and Rth(λ) represent, herein, the retardation in the plane and the retardation in the thickness direction, respectively, at a wavelength of λ. Re(λ) is measured with KOBRA 21ADH or WR (by Oji Scientific Instruments) while allowing light having the wavelength of λ nm to enter in the normal direction of a film.

In case where the film to be measured is a film that is represented by a uniaxial or biaxial indicatrix, Rth(λ) is computed by the following method.

That is, respective Re(λ) s are measured at total eleven points in the normal direction of the film relative to the film surface and in directions inclined every 10° up to 50° on one side from the normal line around an in-plane slow axis (determined by KOBURA 21AD or WR) as an inclination axis (rotation axis) (in case where no slow axis exists, any direction in the plane of the film is defined as a rotation axis) for an incoming light of a wavelength of λ nm, and KOBRA 21ADH or WR computes the Rth(λ) on the basis of the measured retardation, an assumed value of an average refraction index and an input thickness.

In the above instance, when the retardations are expressed as Re and Rth without referring to specific λ, they are the values measured by use of the light in the wavelength of 590 nm. In case where a film has a direction in which the retardation becomes zero at a certain inclination angle from the normal line relative to the film surface around the in-plane slow axis direction (rotation axis), the retardation at an inclination angle greater than the inclination angle is computed by KOBRA 21ADH or WR after changing the sign thereof to negative.

Further, it is also possible to compute Rth according to the following formulae (b) and (c) by measuring the retardation in two arbitrarily inclined directions around the slow axis as the inclination axis (rotation axis) (in case where no slow axis exists, any direction in the plane of the film is defined as a rotation axis), and basing on the measured value, an assumed value on an average refraction index and an input thickness value.

$$Re(\theta) = \left[ nx - \frac{ny \times nz}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (b)$$

Note:

The above $Re(\theta)$ represents the retardation in a direction that inclines in the degree of $\theta$ from the normal direction. In the formula (b), nx represents the refraction index in the slow axis direction in the plane, ny represents the refraction index in the direction perpendicular to nx in the plane, and nz represents the refraction index in the direction perpendicular to the directions of nx and ny.

$$Rth = ((nx+ny)/2 - nz) \times d \quad (c)$$

In case where the film to be measured is a film that can not be expressed by a uniaxial or biaxial indicatrix, that is, a so-called film having no optic axis, $Rth(\lambda)$ is computed according to the following method.

$Rth(\lambda)$ is computed from the retardation that is obtained by measuring the $Re(\lambda)$ at total eleven points in directions inclined every 10° from −50° up to +50° from the normal line relative to the film surface around an in-plane slow axis (determined by KOBURA 21AD or WR) as an inclination axis (rotation axis) for an incoming light of a wavelength of λ nm entering from each of the directions of inclination, an assumed value of an average refraction index and input thickness with KOBRA 21ADH or WR.

By inputting the value of these average refraction indices and thickness, KOBRA 21ADH or WR computes nx, ny, nz. From the computed nx, ny, nz, $Nz=(nx-nz)/(nx-ny)$ is computed further.

In the retardation value of the cellulous acylate film according to the invention, it is preferable that the in-plane retardation (Re) is in the range of 5 to 600 nm, more preferably in the range of 30 to 600 nm, further more preferably in the range of 50 to 600 nm, and the most preferably in the range of 100 to 400 nm. It is preferable that the retardation (Rth) in the film-thickness direction is negative (less than 0 nm), more preferably in the range of −600 to −10 nm, and further more preferably in the range of −200 to −20 nm.

In addition, it is preferable that the retardations satisfy the following both Formulae (I) and (II):

$|Rth|/Re \leq 0.5;$            Formula (I)

and $Re \geq 30.$            Formula (II)

wherein Re indicates an in-plane retardation value (unit: nm) of the cellulous acylate film and Rth indicates a retardation value (unit: nm) in the film-thickness direction of the cellulous acylate film.

It is preferable that the cellulous acylate film of the invention further satisfies the following Formulae (Ia) and (IIa):

$|Rth|/Re \leq 0.5;$            Formula (Ia)

and $50 \leq Re \leq 600.$            Formula (IIa)

It is more preferable that the cellulous acylate film of the invention satisfies the following Formulae (Ab) and (Bb):

$|Rth|/Re \leq 0.4;$            Formula (Ib)

and $100 \leq Re \leq 400.$            Formula (IIb)

It is the most preferable that the cellulous acylate film of the invention satisfies the following Formulae (Ac) and (Bc):

$|Rth|/Re \leq 0.3;$            Formula (Ic)

and $150 \leq Re \leq 300.$            Formula (IIIc)

In the cellulous acylate film of the invention, it is preferable that an angle formed by a direction of the in-plane slow-phase axis and a direction in which the sound-wave propagation velocity becomes the maximum is in the range of 75° to 105°, more preferably in the range of 85° to 95°, further more preferably in the range of 87° to 93°, and the most preferably in the range of 89° to 91°. In the method of manufacturing the cellulous acylate film of the invention, it is preferable that an angle formed by a direction of the in-plane slow-phase axis of the film and the transport direction is in the range of 85° to 95°, more preferably in the range of 87° to 93°, further more preferably in the range of 89° to 91°, and the most preferably in the range of 89.5° to 90.5°.

[Thickness]

The thickness of the cellulose acylate film of the invention is preferably 20 μm-180 μm, more preferably 40 μm-160 μm, even more preferably 60 μm-140 μm. When the thickness is less than 20 μm, the handling ability upon processing the film for a polarizer, or the curing of the polarizer is undesirable. The thickness unevenness of the cellulose acylate film of the invention is preferably 0-2%, more preferably 0-1.5%, especially preferably 0-1%, in both of the transfer direction and the width direction.

[Moisture Permeability]

Next, moisture permeability is described. The moisture permeability in the invention means an evaluated value from the mass change $(g/(m^2 \cdot day))$ before and after humidity conditioning when respective films are used for capping and sealing cups containing calcium chloride to be left under conditions of 40° C. and a relative humidity of 90% for 24 hours.

The moisture permeability rises with the rise of temperature, and also with the rise of humidity, but the relation between the magnitudes of the moisture permeability of films is changeless independently of respective conditions. Therefore, in the invention, the value of mass change at 40° C. and a relative humidity of 90% is employed as the standard.

The moisture permeability of the cellulose acylate film of the invention is preferably 100-400 $g/(m^2 \cdot day)$. The use of a film having the moisture permeability of 100-400 $g/(m^2 \cdot day)$ allows the film to be stuck directly to a polarizing film. The moisture permeability is preferably 100-350 $g/(m^2 \cdot day)$, more preferably 150-300 $g/(m^2 \cdot day)$.

[Cellulose Acylate]

Examples of the polymer which is the constitutive element of the cellulose acylate film of the invention include a cellulose acylate compound, and a compound having acyl-substituted cellulose skeleton obtained by biologically or chemically introducing a functional group into a basic material, which is cellulose.

The polymer may be powdery or granular, or may be pelletized.

Preferably, the water content of the polymer is at most 1.0% by mass, more preferably at most 0.7% by mass, most preferably at most 0.5% by mass. As the case may be, the water content may be preferably at most 0.2% by mass. In case where the water content of the polymer is outside the preferred range, then it is desirable that the polymer is dried by heating before use.

One or more such polymers may be used herein either singly or as combined.

Cellulose acylate is preferably used for the main component polymer of the cellulose acylate film of the invention. The "main component polymer" as referred to herein is meant to indicate the polymer itself when the film is formed of a single polymer, and when the film is formed of different polymers, then it indicates the polymer having the highest mass fraction of all the polymers constituting the film.

The cellulose acylate is an ester of cellulose with an carboxylic acid. The acid to constitute the ester is preferably a fatty acid having from 2 to 22 carbon atoms, more preferably a lower fatty acid having from 2 to 4 carbon atoms.

In the cellulose acylate, all or a part of the hydrogen atoms of the hydroxyl groups existing at the 2-, 3- and 6-positions of the glucose unit constituting the cellulose are substituted with an acyl group. Examples of the acyl group are acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl and cinnamoyl. The acyl group is preferably acetyl, propionyl, butyryl, dodecanoyl, octadecanoyl, pivaloyl, oleoyl, benzoyl, naphthylcarbonyl, cinnamoyl, most preferably acetyl, propionyl, butyryl.

The cellulose ester may be an ester of cellulose with different carboxylic acids. The cellulose acylate may be substituted with different acyl groups.

For the cellulose acylate film of the invention, a substitution degree of acyl is preferably 2.50 to 3.00 from the viewpoint of improving expression in Re, or reducing in the moisture permeability and the heat treatment temperature. It is more preferred that cellulose acylate has the substitution degree of acyl of 2.70 to 2.99, even more preferably 2.80 to 2.98, most preferably 2.90 to 2.98.

Regarding a method for producing cellulose acylate, its basic principle is described in *Wood Chemistry* by Nobuhiko Migita et al., pp. 180-190 (Kyoritsu Publishing, 1968). One typical method for producing cellulose acylate is a liquid-phase acylation method with carboxylic acid anhydride-carboxylic acid-sulfuric acid catalyst. Concretely, a starting material for cellulose such as cotton linter or woody pulp is pretreated with a suitable amount of a carboxylic acid such as acetic acid, and then put into a previously-cooled acylation mixture for esterification to produce a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the process is stoichiometrically excessive over the overall amount of water existing in the cellulose that reacts with the anhydride and that in the system.

Next, after the acylation, the excessive carboxylic acid anhydride still remaining in the system is hydrolyzed, for which, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminium or zinc) may be added thereto. Then, the resulting complete cellulose acylate is saponified and ripened by keeping it at 20 to 90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted acetic acid (or water or diluted acetic acid is put into the cellulose acylate solution) to thereby separate the cellulose acylate, and thereafter this is washed and stabilized to obtain the intended product, cellulose acylate.

Preferably, the polymerization degree of the cellulose acylate is from 150 to 500 as the viscosity-average polymerization degree thereof, more preferably from 200 to 400, even more preferably from 220 to 350. The viscosity-average polymerization degree may be measured according to a limiting viscosity method by Uda et al. (Kazuo Uda, Hideo Saito; *Journal of the Fiber Society of Japan*, Vol. 18, No. 1, pp. 105-120, 1962). The method for measuring the viscosity-average polymerization degree is described also in JP-A-9-95538.

Cellulose acylate where the amount of low-molecular components is small may have a high mean molecular weight (high polymerization degree), but its viscosity maybe lower than that of ordinary cellulose acylate. Such cellulose acylate where the amount of low-molecular components is small may be obtained by removing low-molecular components from cellulose acylate produced in an ordinary method. The removal of low-molecular components may be attained by washing cellulose acylate with a suitable organic solvent. Cellulose acylate where the amount of low-molecular components is small may be obtained by synthesizing it. In case where cellulose acylate where the amount of low-molecular components is small is synthesized, it is desirable that the amount of the sulfuric acid catalyst in acylation is controlled to be from 0.5 to 25 parts by mass relative to 100 parts by mass of cellulose. When the amount of the sulfuric acid catalyst is controlled to fall within the range, then cellulose acylate having a preferable molecular weight distribution (uniform molecular weight distribution) can be produced.

The starting material, cotton for cellulose ester and methods for producing it are described also in Hatsumei Kyokai Disclosure Bulletin (No. 2001-1745, issued Mar. 15, 2001, Hatsumei Kyokai), pp. 7-12.

[Production of Cellulose Acylate Film]

The cellulose acylate film of the invention may be produced from a cellulose acylate solution that contains cellulose acylate and various additives, according to a method of solution casting film formation. In case where the melting point of the cellulose acylate film of the invention or the melting point of a mixture of the cellulose acylate with various additives is lower than the decomposition temperature thereof and is higher than the stretching temperature thereof, then the polymer film may also be produced according to a method of melt film formation. The melting point of the cellulose acylate film is measured by the measuring method described later in an example of the invention. The cellulose acylate film of the invention may be produced according to such a method of melt film formation, and the method of melt film formation is described in JP-A-2000-352620.

[Cellulose Acylate Solution]

(Solvent)

The cellulose acylate film of the invention may be produced, for example, according to a method of solution casting film formation where a cellulose acylate solution that contains a polymer and optionally various additives is cast into a film.

The main solvent of the cellulose acylate solution to be used in producing the cellulose acylate film of the invention is preferably an organic solvent that is a good solvent for the cellulose acylate. The organic solvent of the type is preferably one having a boiling point of not higher than 80° C. from the viewpoint of reducing the load in drying. More preferably, the organic solvent has a boiling point of from 10 to 80° C., even more preferably from 20 to 60° C. As the case may be, an organic solvent having a boiling point of from 30 to 45° C. may also be preferably used for the main solvent.

The main solvent includes halogenohydrocarbons, esters, ketones, ethers, alcohols and hydrocarbons, which may have a branched structure or a cyclic structure. The main solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom). Regarding the main solvent of the cellulose acylate solution to be used in producing the cellulose acylate film of the invention, when the solvent of the solution is a single solvent, then it is the main solvent, but when the solvent is a mixed solvent of different solvents, then the main solvent is the solvent having the highest mass fraction of all the constitutive solvents.

The halogenohydrocarbon is preferably a chlorohydrocarbon, including dichloromethane and chloroform, and dichloromethane is more preferred.

The ester includes, for example, methyl formate, ethyl formate, methyl acetate, ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolan, 4-methyldioxolan, tetrahydrofuran, methyltetrahydrofuran, 1,4-dioxane.

The alcohol includes, for example, methanol, ethanol, 2-propanol.

The hydrocarbon includes, for example, n-pentane, cyclohexane, n-hexane, benzene, toluene.

The organic solvent that may be combined with the main solvent includes halogenohydrocarbons, esters, ketones, ethers, alcohols and hydrocarbons, which may have a branched structure or a cyclic structure. The organic solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom).

The halogenohydrocarbon is preferably a chlorohydrocarbon, including dichloromethane and chloroform, and dichloromethane is more preferred.

The ester includes, for example, methyl formate, ethyl formate, propyl formate, pentyl formate, methyl acetate, ethyl acetate, pentyl acetate.

The ketone includes, for example, acetone, methyl ethyl ketone, diethyl ketone, diisobutyl ketone, cyclopentanone, cyclohexanone, methylcyclohexanone.

The ether includes, for example, diethyl ether, methyl tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol.

The hydrocarbon includes, for example, n-pentane, cyclohexane, n-hexane, benzene, toluene, xylene.

The organic solvent having two or more different types of functional groups includes, for example, 2-ethoxyethyl acetate, 2-methoxyethanol, 2-butoxyethanol, methyl acetacetate.

It is desirable that the total solvent for it contains from 5% to 30% by mass, more preferably from 7% to 25% by mass, even more preferably from 10% to 20% by mass of alcohol from the viewpoint of reducing the load for film peeling from band.

Preferred examples of the combination of organic solvents for use as the solvent in the cellulose acylate solution to be used in producing the cellulose acylate film of the invention are mentioned below, to which, however, the invention should not be limited. The numerical data for ratio are parts by mass.

(1) Dichloromethane/methanol/ethanol/butanol=80/10/5/5
(2) Dichloromethane/methanol/ethanol/butanol=80/5/5/10
(3) Dichloromethane/isobutyl alcohol=90/10
(4) Dichloromethane/acetone/methanol/propanol=80/5/5/10
(5) Dichloromethane/methanol/butanol/cyclohexane=80/8/10/2
(6) Dichloromethane/methyl ethyl ketone/methanol/butanol=80/10/5/5
(7) Dichloromethane/butanol=90/10
(8) Dichloromethane/acetone/methyl ethyl ketone/ethanol/butanol=68/10/10/7/5
(9) Dichloromethane/cyclopentanone/methanol/pentanol=80/2/15/3
(10) Dichloromethane/methyl acetate/ethanol/butanol=70/12/15/3
(11) Dichloromethane/methyl ethyl ketone/methanol/butanol=80/5/5/10
(12) Dichloromethane/methyl ethyl ketone/acetone/methanol/pentanol=50/20/15/5/10
(13) Dichloromethane/1,3-dioxolan/methanol/butanol=70/15/5/10
(14) Dichloromethane/dioxane/acetone/methanol/butanol=75/5/10/5/5
(15) Dichloromethane/acetone/cyclopentanone/ethanol/isobutyl alcohol/oyclohexanone=60/18/3/10/7/2
(16) Dichloromethane/methyl ethyl ketone/acetone/isobutyl alcohol=70/10/10/10
(17) Dichloromethane/acetone/ethyl acetate/butanol/hexane=69/10/10/10/1
(18) Dichloromethane/methyl acetate/methanol/isobutyl alcohol=65/15/10/10
(19) Dichloromethane/cyclopentanone/ethanol/butanol=85/7/3/5
(20) Dichloromethane/methanol/butanol=63/15/2
(21) Dichloromethane=100
(22) Acetone/ethanol/butanol=80/15/5

(23) Methyl acetate/acetone/methanol/butanol=75/10/10/5
(24) 1,3-dioxolan=100
(25) Dichloromethane/methanol=92/8
(26) Dichloromethane/methanol=90/10
(27) Dichloromethane/methanol=87/13
(28) Dichloromethane/ethanol=90/10

A detailed description of a case where a non-halogen organic solvent is the main solvent is given in Hatsumei Kyokai Disclosure Bulletin (No. 2001-1745, issued Mar. 15, 2001, Hatsumei Kyokai), which may be conveniently referred to herein.

(Solution Concentration)

The polymer concentration in the cellulose acylate solution to be prepared herein is preferably from 5% to 40% by mass, more preferably from 10% to 30% by mass, most preferably from 15% to 30% by mass.

The polymer concentration may be so controlled that it could be a predetermined concentration in the stage where polymer is dissolved in solvent. Apart from it, a solution having a low concentration (e.g., from 4% to 14% by mass) is previously prepared, and then it may be concentrated by evaporating the solvent from it. On the other hand, a solution having a high concentration is previously prepared, and it may be diluted. The polymer concentration in the solution may also be reduced by adding additive thereto.

(Additive)

The cellulose acylate solution to be used for producing the cellulose acylate film of the invention may contain various liquid or solid additives in accordance with the use of the film, in the steps of producing it. Examples of the additives are plasticizer (its preferred amount is from 0.01% to 10% by mass of the polymer—the same shall apply hereunder), UV absorbent (0.001% to 1% by mass), powdery particles having a mean particle size of from 5 to 3000 nm (0.001% to 1% by mass), fluorine-containing surfactant (0.001% to 1% by mass), release agent (0.0001% to 1% by mass), antioxidant (0.0001% to 1% by mass), optical anisotropy-controlling agent (0.01% to 10% by mass), IR absorbent (0.001% to 1% by mass).

The plasticizer and the optical anisotropy-controlling agent are compounds having both a hydrophobic part and a hydrophilic part. These compounds are aligned between the polymer chains, thereby changing the retardations of the film. When the compounds are combined with cellulose acylate that is especially preferably used in the invention, the compounds may improve the hydrophobicity of the film and may reduce the humidity-dependent change of the retardation thereof. In addition, when the compounds are combined with the UV absorbent or IR absorbent, the compounds may effectively control the wavelength dependence of the retardation of the polymer film. The additives to be used in the cellulose acylate film of the invention are preferably those not substantially evaporating in the step of drying the film.

From the viewpoint of reducing the humidity-dependent retardation change of the film, the amount of these additives to be added to the film is preferably larger, but with the increase in the amount to be added, there may occur some problems in that the glass transition temperature of the polymer film may lower and the additives may evaporate away during the process of film production. Accordingly, in case where cellulose acetate which is preferably used in the invention is used as the polymer, then the amount of the plasticizer or the optical anisotropy-controlling agent to be added is preferably in the range of 0.01% to 30% by mass, more preferably in the range of 2% to 30% by mass, even more preferably in the range of 5% to 20% by mass relative to the polymer.

For the plasticizer or the optical anisotropy-controlling agent which can be suitably used in case that cellulose acylate is used as a polymer which constitutes the cellulose acylate film, specifically, there can be exemplified a plasticizer described in JP-A-2005-104148 on pages 33 to 34, and an optical anisotropy-controlling agent described in JP-A-2005-104148 on pages 38 to 89. For the IR absorbent, it is described in JP-A-2001-194522 as an example. The time of adding the additives may be properly determined depending on the types of the additives. For the additives, it is described in Hatsumei Kyokai Disclosure Bulletin (No. 2001-1745, issued Mar. 15, 2001, Hatsumei Kyokai) on pages 16 to 22.

(Preparation of Cellulose Acylate Solution)

The cellulose acylate solution may be prepared, for example, according to the methods described in JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302389, JP-A-11-322946, JP-A-11-322947, JP-A-11-323017, JP-A-2000-53784, JP-A-2000-273184 and JP-A-2000-273239. Concretely, cellulose acylate and solvent are mixed and stirred so that the cellulose acylate is swollen, and as the case may be, this is cooled or heated so as to dissolve the cellulose acylate, and thereafter this is filtered to obtain a cellulose acylate solution.

According to the invention, in order to improve solubility of cellulose acylate in a solvent, there is included a process of cooling and/or heating a mixture of cellulose acylate and a solvent.

In case of cooling the mixture of cellulose acylate and a solvent in which a halogen-containing organic solvent is used as the solvent, it is preferred to include a process of cooling the mixture at −100 to 10° C. Further, it is preferred to include a process of swelling the mixture at −10 to 39° C. before the process of cooling, and a process of heating the mixture at 0 to 39° C. after the process of cooling.

In case of heating the mixture of cellulose acylate and a solvent 10 in which a halogen-containing organic solvent is used as the solvent, it is preferred to include a process of dissolving the cellulose acylate in the solvent according to at least one of the following methods (a) and (b).

(a): A mixture is swollen at −10 to 39° C., and then heated at 0 to 39° C.

(b): A mixture is swollen at −10 to 39° C., and then heated at 40 to 240° C. under pressure of 0.2 to 30 MPa. After that, the mixture is cooled at 0 to 39° C.

In addition, in case of cooling the mixture of cellulose acylate and a solvent in which a non-halogen-containing organic solvent is used as the solvent, it is preferred to include a process of cooling the mixture at −100 to −10° C. Further, it is preferred to include a process of swelling the mixture at −10 to 55° C. before the process of cooling, and a process of heating the mixture at 0 to 57° C. after the process of cooling.

In case of heating the mixture of cellulose acylate and a solvent in which a non-halogen-containing organic solvent is used as the solvent, it is preferred to include a process of dissolving the cellulose acylate in the solvent according to at least one of the following methods (c) and (d).

(c): A mixture is swollen at −10 to 55° C., and then heated at 0 to 57° C.

(d): A mixture is swollen at −10 to 55° C., and then heated at 40 to 240° C. under pressure of 0.2 to 30 MPa. After that, the mixture is cooled at 0 to 57° C.

[Casting, Drying]

The cellulose acylate film of the invention may be produced according to a conventional method of solution casting film formation, using a conventional apparatus for solution casting film formation.

Concretely, a dope (polymer solution) prepared in a dissolver (tank) is filtered, and then once stored in a storage tank in which the dope is degassed to be a final dope. The dope is kept at 30° C., and fed into a pressure die from the dope discharge port of the tank, via a metering pressure gear pump through which a predetermined amount of the dope can be fed with accuracy, for example, based on the controlled revolution thereof, and then the dope is uniformly cast onto the metal support of a casting unit that runs endlessly, via the slit of the pressure die (casting step). Next, at a peeling point at which the metal support reaches almost after having traveled round the drum, a semi-dried dope film (this may be referred to as a web) is peeled from the metal support, and then transported to a drying zone in which the web is dried while conveyed with rolls therein. In this invention, the metal support is preferably a metal belt or metal drum.

Thus dried film has a residual solvent amount of preferably 0-2% by mass, more preferably 0-1% by mass. This film may be directly transported to a stretching zone or heat treatment zone, or may be wound and then subjected to stretching or heat treatment in off-line operation. The film has a width of preferably 0.5-5 m, more preferably 0.7-3 m. When the film is once wound, the wound length is preferably 300-30000 m, more preferably 500-10000 m, even more preferably 1000-7000 m.

[Heat Treatment]

In the invention, in order to improve both of the optical property and the dynamic property of matter, the formed cellulous acylate film is subjected to the heat treatment. In the method of the invention, it is important to control the contraction ratio of the film in the width direction when it is heat-treated. By the control of the contraction ratio, the peaks at $2\theta_2$ and $2\theta_4$ observed in the X-ray diffraction of the structure growing in the heat treatment are appropriately adjusted.

The method of the invention includes the processes of transporting the cellulous acylate film and performing the heat treatment in which the cellulous acylate film is maintained at $(-285 \times S+1000)°$ C. or more and less than the melting point when it is assumed that the whole substitution degree is defined as S. The temperature of the heat treatment is more preferably in the range of $(-285 \times S+1020)°$ C. to the melting point, further more preferably in the range of $(-285 \times S+1040)°$ C. to (melting point $-5$)° C., and the most preferably in the range of $(-285 \times S+1050)°$ C. to (melting point $-10$)° C.

The cellulose acylate film of the invention can be preferably produced by a method comprising maintaining a cellulose acylate film at a temperature of Tc or higher and lower than the melting point of the film for a heat treatment. Tc represents a crystallization temperature (unit: ° C.) of the cellulose acylate film before the heat treatment. The temperature of the heat treatment is preferably in the range of Tc to (melting point $-5$)° C., more preferably in the range of Tc to (melting point $-10$)° C., still more preferably in the range of (Tc+5) to (melting point $-15$)° C. Tc represents a crystallization temperature (unit: ° C.) of the cellulose acylate film before the heat treatment. Crystallization temperature is a temperature at which the cellulose acylate polymer arranges regularly to form a periodic structure. When the temperature goes over Tc, a structure observable in the X-ray diffraction grows. The method for measuring Tc is described below. Tc is generally higher than a glass transition temperature (Tg). For example, Tc of cellulose triacetate film with a substitution degree of 2.92 is about 170° C. The melting point mentioned above represents the melting point (unit: ° C.) of the cellulose acylate film before the heat treatment. The method for measuring the melting point is described below. The melting point of a cellulose triacetate film with a substitution degree of 2.85 is about 285° C. and the melting point of cellulose triacetate film with a substitution degree of 2.92 is about 290° C. These melting points vary depending on additives contained in the film and conditions in the film preparation.

It is very important that the heat treatment process includes a process of contracting the film in the width direction for improving both of the optical property and the dynamic property of matter. The contracting process in the width direction may be included in the heat treatment process. In addition, the heat treatment process or the process before or after the heat treatment process may further include a process of extending the film in the width direction. The contracting process in the width direction may be performed to one end and the contracting process and the extending process may be repeatedly performed.

The contraction ratio of the film is preferably in the range of 5% to 80% before and after the process of contracting the film in the width direction, more preferably in the range of 10% to 70%, further more preferably in the range of 20% to 60%, and the most preferably in the range of 25% to 50%. Since the heat treatment process including the process of contracting the film in the width direction is performed, the structure observed with the X-ray diffraction can bidirectionally grow in the in-plane direction. Accordingly, it is possible to obtain the large Re and to obtain the cellulous acylate film in which Rth as well as Re is controlled. Even when a heat treatment not including the contracting process in the width direction is performed and then the film is contracted in the width direction, this effect cannot be obtained as well.

When the end portion of the film is gripped by a tenter clip, the contraction ratio in the width direction can be controlled with the ratio of a broaden width of a rail. When the end portion of the film is not fixed and is held by only a device fixing the film in the transport direction such as a nip roll, the contraction ratio can be controlled by adjusting a distance between devices fixing the film in the transport direction, adjusting a tension applied to the film, adjusting the amount of heat given to the film, or the like. The contraction ratio in the width direction was evaluated by measuring the whole width before and after contracting the film.

Contraction Ratio in width direction (%)=100×(whole width before contraction−whole width after contraction)/whole width before contraction In addition, by setting the temperature of the heat treatment as described above, it is possible to manufacture the cellulous acylate film having the large Re of the invention. The heat treatment is generally performed for 0.01 minute or more and less than 60 minutes, preferably from 0.03 to 10 minutes, and more preferably from 0.05 to 5 minutes.

[Stretching]

In order to adjust the value of Re and Rth, it is preferred that the cellulose acylate film being transported into a heat treatment zone is subjected to the heat treatment and the stretching at the same time, or the cellulose acylate film may be subjected to the stretching after being subjected to the heat treatment.

(Stretching Method)

For the stretching, longitudinal stretching may be carried out, for example, in the apparatuses having a heating zone between two or more apparatuses (for example, nip rolls, suction drum) which maintains the film in transport direction, in which the circumferential velocity on an exit side is larger, or stretching by grasping the both ends of the film with chucks for widening the film in the direction perpendicular to the transport direction may be carried out. Otherwise, the above both stretching method may be carried out in combination thereof.

In case that the cellulose acylate film is subjected to the stretching after being subjected to the heat treatment, first, the film may be cooled after the heat treatment and then, preferably, subjected to the stretching process. In such a case, it is preferred that the film is subjected to the heat treatment by being transported to and then passed through the heat treatment zone; and the film is subjected to the stretching by grasping the both ends of the film with chucks for widening the film in the direction perpendicular to the transport direction.

The stretching ratio can be arbitrarily set in accordance with the retardation desired for the film, and is preferably in the range of 3 to 500%, more preferably in the range of 5 to 100%, even more preferably in the range of 10 to 80%, and especially preferably in the range of 20 to 60%. The stretching may be effected in one step operation or multi-step operation. The 'stretching ratio (%)' herein means a value obtained by using the following formula.

Stretching ratio (%)=100×{(length after stretching)−(length before stretching)}/length before stretching The stretching velocity in the stretching is preferably in the range of 10 to 10000%/min, more preferably in the range of 20 to 1000%/min, and even more preferably in the range of 30 to 800%/min.

The cellulose acylate film of the invention has preferably a monolayer structure. A film having a monolayer structure is a polymer film of one sheet, instead of one composed of a plurality of stuck film materials. Also included is one sheet of polymer film produced from a plurality of polymer solutions by a sequential flow casting system or co-flow casting system. In this case, a polymer film having a distribution in the thickness direction can be obtained by suitably adjusting the type or blending amount of an additive, the molecular weight distribution of the polymer, or the type of the polymer, etc. Also included is a film having various functional portions such as an optical anisotropic portion, an antiglare portion, a gas barrier portion or a moisture resistant portion in one film.

[Surface Treatment]

The cellulose acylate film of the invention may be surface-treated in any desired manner to thereby improve its adhesiveness to various functional layers (e.g., undercoat layer, back layer, optically anisotropic layer). The surface treatment includes glow discharge treatment, UV irradiation treatment, corona treatment, flame treatment, saponification treatment (acid saponification treatment, alkali saponification treatment). In particular, glow discharge treatment and alkali saponification treatment are preferred. The "glow discharge treatment" as referred to herein is a plasma treatment of treating a film surface in the presence of a plasma-exciting vapor. The details of the surface treatment are described in Hatsumei Kyokai Disclosure Bulletin (No. 2001-1745, issued Mar. 15, 2001, Hatsumei Kyokai), and may be conveniently referred to herein.

For improving the adhesiveness between the film surface of the cellulose acylate film of the invention and a functional layer to be formed thereon, an undercoat layer (adhesive layer) may be formed on the film in place of or in addition to the surface treatment as above. The undercoat layer is described in Hatsumei Kyokai Disclosure Bulletin (No. 2001-1745, issued Mar. 15, 2001, Hatsumei Kyokai), page 32, which may be conveniently referred to herein. Functional layers that may be formed on the cellulose acylate film of the invention are described in Hatsumei Kyokai Disclosure Bulletin (No. 2001-1745, issued Mar. 15, 2001, Hatsumei Kyokai), pp. 32-45, which may be conveniently referred to herein.

<<Retardation Film>>

The cellulose acylate film of the invention may be used as a retardation film. "Retardation film" means an optical material that is generally used in display devices such as liquid crystal display devices and has optical anisotropy, and its meaning may be the same as that of retarder, optical compensatory film, and optical compensatory sheet. In a liquid crystal display device, the retardation film is used for the purpose of increasing the contrast of the display panel and improving the viewing angle characteristic and the coloration thereof.

Using the cellulose acylate film of the invention makes it easy to produce a retardation film of which Re and Rth can be controlled in any desired manner. For example, as a retardation film of which the retardation does not change dependently of the inclination angle to the slow axis direction, a film that satisfies Re≧50 nm and |Rth|≦15 nm can be favorably produced; and a film that satisfies Re≧100 nm and |Rth|≦10 nm can be produced more favorably.

The cellulose acylate film of the invention may be used as a retardation film directly as it is. Plural sheets of the cellulose acylate film of the invention may be laminated, or the cellulose acylate film of invention may be laminated with any other film not falling within the scope of the invention, and the resulting laminate films thus having suitably controlled Re and Rth may also be used as retardation films. For laminating the films, a paste or an adhesive may be used.

As the case may be, the cellulose acylate film of the invention may be used as a support of retardation films. An optically anisotropic layer of liquid crystal may be provided on the support to give a retardation film. The optical-anisotropic layer applicable to the retardation film of the invention may be formed of, for example, a composition containing a liquid crystalline compound or a polymer film having birefringence.

The liquid crystalline compound is preferably a discotic liquid crystalline compound or a rod-shaped liquid crystalline compound.

[Discotic Liquid Crystalline Compound]

Examples of the discotic liquid crystalline compound usable in the invention are described in various publications (e.g., C. Destrade et al., *Mol. Cryst. Liq. Cryst.*, Vol. 71, page 111 (1981); *Quarterly Outline of Chemistry*, No. 22, Chemistry of Liquid Crystal, Chap. 5, Chap. 10, Sec. 2 (1994), by the Chemical Society of Japan; B. Kohne et al., *Angew. Chem. Soc. Chem. Comm.*, page 1794 (1985); J. Zhang et al., *J. Am. Chem. Soc.*, Vol. 116, page 2655 (1994)).

Preferably, the discotic liquid crystalline molecules are fixed as aligned in the optically anisotropic layer; and most preferably, they are fixed through polymerization. The polymerization of discotic liquid crystalline molecules is described in JP-A-8-27284. For fixing discotic liquid crystalline molecules through polymerization, it is necessary that a substituent of a polymerizing group is bonded to the disc core of the discotic liquid crystalline molecules. However, when a polymerizing group is directly bonded to the disc core, then the molecules could hardly keep their alignment condition during the polymerization. Accordingly, a linking group is introduced between the disc core and the polymerizing group. The discotic liquid crystalline molecules having a polymerizing group are disclosed in JP-A-2001-4387.

[Rod-shaped Liquid Crystalline Compound]

Examples of the rod-shaped liquid crystalline compound usable in the invention are azomethines, azoxy compounds, cyanobiphenyls, cyanophenyl esters, benzoates, phenyl cyclohexanecarboxylates, cyanophenylcyclohexanes, cyanosubstituted phenylpyrimidines, alkoxy-substituted phenylpyrimidines, phenyldioxanes, tolans and alkenylcyclohexylbenzonitriles. However, not limited to such low-molecular rod-shaped liquid crystalline compounds, also usable herein are high-molecular rod-shaped liquid crystal compounds.

In the optically anisotropic layer, the rod-shaped liquid crystalline molecules are preferably fixed as aligned therein; and most preferably, they are fixed through polymerization. Examples of the polymerizing rod-shaped liquid crystalline compound usable in the invention are described, for example, in *Macromol. Chem.*, Vol. 190, page 2255 (1989); *Advanced materials*, Vol. 5, page 107 (1993); U.S. Pat. Nos. 4,683,327, 5,622,648, 5,770,107; WO95/22586, WO95/24455, WO97/00600, WO98/23580, WO98/52905; JP-A-1-272551, JP-A-6-16616, JP-A-7-110469, JP-A-11-80081 and JP-A-2001-328973.

(Optically Anisotropic Layer of Polymer Film)

The optically anisotropic layer may be formed of a polymer film. The polymer film maybe made of a polymer capable of expressing optical anisotropy. Examples of the polymer capable of expressing optical anisotropy are polyolefins (e.g., polyethylene, polypropylene, norbornenic polymer), polycarbonates, polyarylates, polysulfones, polyvinyl alcohols, polymethacrylates, polyacrylates, and cellulose esters (e.g., cellulose triacetate, cellulose diacetate). The polymer may be a copolymer or a polymer mixture of these polymers.

<<Polarizer>>

The cellulose acylate film or the retardation film of the invention may be used as a protective film of a polarizer (polarizer of the invention). The polarizer of the invention comprises a polarizing film and two polarizer-protective films (cellulose acylate films) that protect both surfaces of the film, in which the cellulose acylate film or the retardation film of the invention may be used as at least one of the polarizer-protective films.

In case where the cellulose acylate film of the invention is used as the polarizer-protective film, then it is desirable that the cellulose acylate film of the invention is subjected to the above-mentioned surface treatment (described also in JP-A-6-94915, JP-A-6-118232) for hydrophilication. For example, the film is preferably subjected to glow discharge treatment, corona discharge treatment or alkali saponification treatment. In particular, when the polymer to constitute the cellulose acylate film of the invention is cellulose acylate, then the surface treatment is most preferably alkali saponification treatment.

For the polarizing film, for example, herein usable is a polyvinyl alcohol film dipped and stretched in an iodine solution. In case where such a polyvinyl alcohol dipped and stretched in an iodine solution is used as the polarizing film, then the treated surface of the cellulose acylate film of the invention may be directly stuck to both surfaces of the polarizing film with an adhesive. In the production method of the invention, it is desirable that the cellulose acylate film is directly stuck to the polarizing film in that manner. The adhesive may be an aqueous solution of polyvinyl alcohol or polyvinyl acetal (e.g., polyvinyl butyral), or a latex of vinylic polymer (e.g., polybutyl acrylate). An especially preferred example of the adhesive is an aqueous solution of completely-saponified polyvinyl alcohol.

In a liquid crystal display device, in general, a liquid crystal cell is provided between two polarizers, and therefore, the device has four polarizer-protective films. The cellulose acylate film of the invention may be used as any of the four polarizer-protective films. Especially advantageously in such a liquid crystal display device, the cellulose acylate film of the invention is used as the protective film to be disposed between the polarizing film and the liquid crystal layer (liquid crystal cell). On the protective film to be disposed on the opposite side to the cellulose acylate film of the invention via the polarizing film therebetween, optionally provided is a transparent hard-coat layer, an antiglare layer or an antireflection layer. In particular, the film of the invention is favorably used as the polarizer-protective film on the outermost side of the display panel of a liquid crystal display device.

<<Liquid Crystal Display Device>>

The transparent polymer film, the retardation film and the polarizer of the invention may be used in liquid crystal display devices of various display modes. Liquid crystal display modes to which the films are applicable are described below. Of those modes, the transparent polymer film, the retardation film and the polarizer of the invention are favorably used in liquid crystal display devices of VA mode and IPS mode. The liquid crystal display devices may be any of transmission type, reflection type or semi-transmission type.

(TN-Type Liquid Crystal Display Device)

The transparent polymer film of the invention may be used as a support of the retardation film in a TN-type liquid crystal display device having a TN-mode liquid crystal cell. TN-mode liquid crystal cells and TN-type liquid crystal display devices are well known from the past. The retardation film to be used in TN-type liquid crystal display devices is described in JP-A-3-9325, JP-A-6-148429, JP-A-8-50206, JP-A-9-26572; and Mori et al's reports (*Jpn. J. Appl. Phys.*, Vol. 36 (1997), p. 143; *Jpn. J. Appl. Phys.*, Vol. 36 (1997), p. 1068).

(STN-Type Liquid Crystal Display Device)

The transparent polymer film of the invention may be used as a support of the retardation film in an STN-type liquid crystal display device having an STN-mode liquid crystal cell. In general, in an STN-type liquid crystal display device, the rod-shaped liquid crystalline molecules in the liquid crystal cell are twisted within a range of from 90 to 360 degrees, and the product (And) of the refractive anisotropy (Δn) of the rod-shaped liquid crystalline molecule and the cell gap (d) is within a range of from 300 to 1500 nm. The retardation film to be used in STN-type liquid crystal display devices is described in JP-A-2000-105316.

(VA-Type Liquid Crystal Display Device)

The transparent polymer film of the invention is especially advantageously used as the retardation film or as a support of the retardation film in a VA-type liquid crystal display device having a VA-mode liquid crystal cell. The VA-type liquid crystal display device may be a multi-domain system, for example, as in JP-A-10-123576. In these embodiments, the polarizer that comprises the transparent polymer film of the invention contributes to enlarging the viewing angle of the display panel and to improving the contrast thereof.

(IPS-Type Liquid Crystal Display Device and ECB-Type Liquid Crystal Display Device)

The transparent polymer film of the invention is especially advantageously used as the retardation film, as a support of the retardation film or as a protective film of the polarizer in an IPS-type liquid crystal display device and an ECB-type liquid crystal display device having an IPS-mode or ECB-mode liquid crystal cell. In the devices of these modes, the liquid crystal material is aligned nearly in parallel in black display, or that is, the liquid crystal molecules are aligned in parallel to the substrate face while no voltage is applied thereto, thereby giving black display. In these embodiments, the polarizer that comprises the transparent polymer film of the invention contributes to enlarging the viewing angle of the display panel and to improving the contrast thereof.

(OCB-Type Liquid Crystal Display Device and HAN-Type Liquid Crystal Display Device)

The transparent polymer film of the invention is also especially advantageously used as a support of the retardation film in an OCB-type liquid crystal display device having an OCB-mode liquid crystal cell and in a HAN-type liquid crystal display device having a HAN-mode liquid crystal cell. The retardation film to be used in an OCB-type liquid crystal display device and a HAN-type liquid crystal display device is preferably so designed that the direction in which the absolute value of the retardation of the film is the smallest does not exist both in the in-plane direction of the retardation film and in the normal direction thereof. The optical properties of the retardation film to be used in an OCB-type liquid crystal display device and a HAN-type liquid crystal display device may vary depending on the optical properties of the optically anisotropic layer therein, the optical properties of the support therein and the relative positioning of the optically anisotropic layer and the support therein. The retardation film to be used in an OCB-type liquid crystal display device and a HAN-type liquid crystal display device is described in JP-A-9-197397. It is described also in a Mori et al's report (*Jpn. J. Appl. Phys.*, Vol. 38 (1999), p. 2837).

(Reflection-Type Liquid Crystal Display Device)

The transparent polymer film of the invention may be advantageously used also as the retardation film in TN-mode, STN-mode, HAN-mode and GH (guest-host)-mode reflection-type liquid crystal display devices. These display modes are well known from the past. TN-mode reflection-type liquid crystal display devices are described in JP-A-10-123478, WO98/48320, and Japanese Patent 3022477. The retardation film for use in reflection-type liquid crystal display devices is described in WO00/65384.

(Other Liquid Crystal Display Devices)

The transparent polymer film of the invention may be advantageously used also as a support of the retardation film in an ASM (axially symmetric aligned microcell)-type liquid crystal display device having an ASM-mode liquid crystal cell. The ASM-mode liquid crystal cell is characterized in that the cell thickness is held by a position-adjustable resin spacer. The other properties of the cell are the same as those of the TN-mode liquid crystal cell. The ASM-mode liquid crystal cell and the ASM-type liquid crystal display device are described in a Kume et al's report (Kume et al., SID 98 Digest 1089 (1988)).

(Hard Coat Film, Antiglare Film, Antireflection Film)

As the case maybe, the transparent polymer film of the invention may be applied to a hard coat film, an antiglare film and an antireflection film. For the purpose of improving the visibility of flat panel displays such as LCD, PDP, CRT, EL, any or all of a hard coat layer, an antiglare layer and an antireflection layer may be given to one or both surfaces of the transparent polymer film of the invention. Preferred embodiments of such antiglare film and antireflection film are described in detail in Hatsumei Kyokai Disclosure Bulletin (No. 2001-1745, issued Mar. 15, 2001, Hatsumei Kyokai), pp. 54-57, and are preferably employed also for the transparent polymer film of the invention.

EXAMPLES

<<Measuring Method>>

Hereinafter, methods of measuring and evaluating the characteristics used in the following Examples and Comparative Examples will be described.

[X-Ray Diffractive Intensity]

Three points (the center portion and end portions (positions away from both end portions by 5% of the whole width)) in the width direction of the film were sampled, the sample of 2 cm□ was taken, the average value of each point measured in accordance with the above-mentioned method was calculated, and Ic/(Iam+Ic), a peak position, a half-value width of the peak, and $Ic_1/Ic_2$ were calculated.

[Haze]

Five points (the center portion, end portions (positions away from both end portions by 5% of the whole width)), and two points of middle portions between the center portion and the end portions) in the width direction of the film were sampled and then the average value of each point measured in accordance with the above-mentioned method was calculated to evaluate the haze value.

[Sound-Wave Propagation Velocity]

Three points (the center portion and end portions (positions away from both end portions by 5% of the whole width)) in the width direction of the film were sampled and then the average value of each point measured in accordance with the above-mentioned method was calculated to evaluate a direction in which the sound-wave propagation velocity becomes the maximum.

[Retardation]

Five points (the center portion, end portions (positions away from both end portions by 5% of the whole width)), and two points of middle portions between the center portion and the end portions) in the width direction of the film were sampled each 100 m in the longitudinal direction, the sample of 5 cm□ was taken, the average value of each point measured in accordance with the above-mentioned method was calculated to evaluate Re, Rth, and then the direction of the in-plane slow-phase axis. Further, the angle formed by the direction in which the sound-wave propagation velocity becomes the maximum and the direction of the slow-phase axis and the angle formed by the transport direction of the film and the direction (average value) of the slow-phase axis were calculated.

[Tc]

20 mg of a sample was placed in a pan for the Differential Scanning Calorimetory (DSC) measurement and the temperature of the sample was raised from 30° C. to 120° C. at a rate of 10° C./min in a nitrogen stream and kept at the temperature for 15 minutes, followed by cooling to 30° C. at a rate of −20° C./min. Thereafter, the temperature of the sample was raised again from 30° C. to 300° C. and the temperature at the apex of an exothermal peak appeared during the temperature rising was adopted as Tc.

[Melting Point]

20 mg of a sample was placed in a pan for the Differential Scanning Calorimetory (DSC) measurement and the temperature of the sample was raised from 30° C. to 120° C. at a rate of 10° C./min in a nitrogen stream and kept at the temperature for 15 minutes, followed by cooling to 30° C. at a rate of −20° C./min. Thereafter, the temperature of the sample was raised again from 30° C. to 300° C. and the temperature at the apex of an endothermal peak appeared during the temperature rising was adopted as a melting point of the film.

[Polarization Degree]

Two sheets of the polarizer produced herein were stuck together with their absorption axes kept in parallel to each other and the transmittance (Tp) thereof was measured; and the two sheets were stuck together with their absorption axes kept perpendicular to each other and the transmittance (Tc) thereof was measured. The polarization degree (P) of the polarizer was calculated in accordance with the following formula:

$$\text{Polarization Degree } P=((Tp-Tc)/(Tp+Tc))^{0.5}$$

Hereinafter, the characteristics of the invention will be more concretely described with reference to the following Examples and Comparative Examples. In the following Examples, materials, the amount and the ratio thereof, details of the treatment, and the treatment process may be suitably modified within the range of not impairing the purpose of the invention. Accordingly, the invention should not be limitatively interpreted by the Examples mentioned below.

Examples 101 to 114, Comparative Examples 101 to 107

(Preparation of Polymer Solution)
1) Cellulose Acylate

In respective Examples 101 to 114 and Comparative Examples 101 to 107, the cellulose acylates A or B described later was used according to Table 1. Each cellulose acylate was heated and dried at 120° C. to have a water content of 0.5% by mass or less. After that, 15 parts by mass of cellulose acylate was used.

Cellulous Acylate A:

Powder of cellulous acetate having a substitution degree of 2. B5 was used. In cellulous acylate A, a viscosity-average polymerization degree was 300, a substitution degree of 6-acetyl group was 0.89, a acetone extraction was 7 mass %, a ratio of mass average molecular weight/number average molecular weight was 2.3, a percentage of water content was 0.2 mass %, a viscosity of 6 mass %-dichloromethane solvent was 305 mPa·s, residual acetic acid amount was 0.1 mass % or less, Ca-containing amount was 65 ppm, Mg-containing amount was 26 ppm, Fe-containing amount was 0.8 ppm, sulphuric acid ion-containing amount was 18 ppm, a yellow index was 1.9, and glass acetic acid amount was 47 ppm. An average particle size was 1.5 mm and a standard deviation was 0.5 mm.

Cellulous Acylate B:

Powder of cellulous acetate having a substitution degree of 2.95 was used. In cellulous acylate B, a viscosity-average polymerization degree was 300 and a substitution degree of 6-acetyl group was 0.94.

[Substitution Degree]

The substitution degree of acyl of cellulose acylate was determined by the use of $^{13}$C-NMR according to the method described in *Carbohydr. Res.* 273 (1995), pp. 83 to 91 (by Tezuka, et al).

[Polymerization Degree]

The cellulose acylate produced herein is absolutely dried, then about 0.2 g thereof is accurately weighed, and dissolved in 100 mL of a mixed solvent of dichloromethane:ethanol=9:1 (mass ratio). Using an Ostwald viscometer, the time (second) taken by its dropping at 25° C. is measured, and the polymerization degree DP is calculated according to the following formulae.

$$\eta_{rel}=T/T_0$$

$$[\eta]=\ln(\eta_{rel})/C$$

$$DP=[\eta]/Km$$

wherein T indicates the time (second) taken by the dropping sample; $T_0$ indicates the time (second) taken by the dropping solvent alone; ln indicates a natural logarithm; C indicates the concentration (g/L); and Km is $6\times10^{-4}$.

2) Solvent

In respective Examples and Comparative Examples, either the following solvent A or B was used according to Table 1. Each solvent had the water content of 0.2% by mass or below.

Solvent A:

A mixed solvent in which dichloromethane/methanol/butanol (83/15/2 parts by mass) are mixed was used.

Solvent B:

A mixed solvent in which dichloromethane/methanol (92/8 parts by mass) are mixed was used.

3) Additive

In respective Examples and Comparative Examples, either an additive A or B having the following composition was used according to Table 1.

Additive A:
Triphenyl phosphate (1.2 parts by mass)
Biphenyldiphenyl phosphate (0.6 part by mass)
Silicon dioxide fine particles (particle size: 20 nm, Mohs hardness: about 7) (0.08 part by mass)

Additive B:
Silicon dioxide fine particles (particle size: 20 nm, Mohs hardness: about 7) (0.08 part by mass)

4) Dissolution

In respective Examples and Comparative Examples, the dissolution process A or B described later was used according to Table 1.

Dissolution Process A:

The solvent and the additive mentioned above were put into a 400-liter stainless dissolution tank, which has stirring blades and is cooled with cooling water that runs around its periphery. With stirring and dispersing them therein, the cellulose acylate was gradually added to the tank. After the addition, this was stirred at room temperature for 2 hours. After thus swollen for 3 hours, this was again stirred to obtain a cellulose acylate solution.

For the stirring, used were a dissolver-type eccentric stirring shaft that runs at a peripheral speed of 15 m/sec (shear stress, $5\times10^4$ kgf/m/sec² [$4.9\times10^5$ N/m/sec²]) and a stirring shaft that has an anchor blade at the center axis thereof and runs at a peripheral speed of 1 m/sec (shear stress, $1\times10^4$ kgf/m/sec² [$9.8\times10^4$ N/m/sec²]). For the swelling, the high-speed stirring shaft was stopped and the peripheral speed of the anchor blade-having stirring shaft was reduced to 0.5 m/sec.

The swollen solution in the tank was heated up to 50° C. via a jacketed pipe line, and then further heated up to 90° C. under a pressure of 2 MPa for complete dissolution. The heating time was 15 minutes. In this stage, the filter, the housing and the pipe line that are exposed to high temperature are all made of Hastelloy alloy having good corrosion resistance; and the system is covered with a jacket for circulating a heat carrier therethrough for keeping the system warmed and heated.

Next, this was cooled to 36° C. to obtain a cellulose acylate solution.

Dissolution Process B:

The solvent and the additive mentioned above were put into a 400-liter stainless dissolution tank, which has stirring blades and is cooled with cooling water that runs around its periphery. With stirring and dispersing them therein, the cellulose acylate was gradually added to the tank. After the addition, this was stirred at room temperature for 2 hours. After thus swollen for 3 hours, this was again stirred to obtain a cellulose acylate solution.

For the stirring, used were a dissolver-type eccentric stirring shaft that runs at a peripheral speed of 15 m/sec (shear stress, $5\times10^4$ kgf/m/sec² [$4.9\times10^5$ N/m/sec²]) and a stirring shaft that has an anchor blade at the center axis thereof and runs at a peripheral speed of 1 m/sec (shear stress, $1\times10^4$ kgf/m/sec² [$9.8\times10^4$ N/m/sec²]). For the swelling, the high-speed stirring shaft was stopped and the peripheral speed of the anchor blade-having stirring shaft was reduced to 0.5 m/sec.

The swollen mixture in the tank was transported via a screw pump of which center part of the shaft was heated at 30° C., and passed through a cooling part, which was cooled from the periphery part of the screw, at −70° C. for 3 min. The cooling process was carried out by using refrigerant of −75° C. cooled in a refrigerator. The mixture obtained by the cooling process was transported to the stainless vessel via the screw pump of which column was heated at 30° C.

Next, this was stirred at 30° C. for 2 hours to obtain a cellulose acylate solution.

5) Filtration

The cellulose acylate solution thus obtained was filtered through a paper filter sheet (#63, manufactured by Toyo Roshi Kaisha, Ltd.) having an absolute filtration accuracy of 10 μm, and then through a sintered metal filter sheet (FH025, manufactured by Pall Corporation) having an absolute filtration accuracy of 2.5 μm to obtain a polymer solution.

(Production of Film)

In respective Examples and Comparative Examples, either an film-forming process A or B described later was used according to Table 1.

Film-Forming Process A:

The cellulose acylate solution was heated at 30° C., passed through a caster, Giesser (described in JP-A-11-314233), and cast onto a mirror-faced stainless support having a band length of 60 m and the surface temperature of the mirror-faced stainless support was set at 15° C., at a casting speed of 50 m/min. The casting width was 200 cm. The space temperature in the entire casting zone was set at 15° C. At 50 cm before the end point of the casting zone, the cellulose acylate film thus cast and rolled was peeled off from the band and exposed to drying air applied thereto at 45° C. Next, this was dried at 110° C. for 5 minutes and then at 140° C. for 10 minutes to obtain a transparent film of cellulose acylate having a thickness of 80 μm.

Film-Forming Process B:

The polymer solution was heated at 30° C., passed through a caster, Giesser, and cast onto a mirror-faced stainless support which is a drum having a diameter of 3 m. The temperature of the surface of the support was set at −5° C., a casting speed was set at 100 m/min, and the casting width was 200 cm. The space temperature in the entire casting zone was set at 15° C. At 50 cm before the end point of the casting zone, the cellulose acylate film thus cast and rolled was peeled off from the drum, and then the both ends of the film was clipped with pin tenters. The cellulose acylate film held with pin tenters was transported to a drying zone. At first, the film was exposed to drying air applied thereto at 45° C. Next, this was dried at 110° C. for 5 minutes and then at 140° C. for 10 minutes to obtain a transparent film of cellulose acylate having a thickness of 80 μm.

(Heat Treatment)

In respective Examples and Comparative Examples, the heat treating method used was selected from following heat treating method A to C and was shown in Table 1.

The elongation of the film was obtained according to the following formula in such a manner that gauge lines were given to the film at a constant interval in the direction perpendicular to the transport direction of the film and the interval was measured before and after the heat treatment.

Elongation of film (%)=100×((interval of gauge lines after heat treatment)−(interval of gauge lines before heat treatment))/interval of gauge lines before heat treatment In the Table 1, TAC A indicates commercial cellulose acylate film (FUJITAC T80UZ; manufactured by Fuji Photo Film Co., Ltd.) and TAC B indicates commercial cellulose acylate film (FUJITAC TD80UL; manufactured by Fuji Photo Film Co., Ltd.).

Heat Treatment Process A

A heat treatment was subjected to the obtained film by using a device having a heating zone between two nip rolls. A contraction ratio in the width direction was controlled by adjusting the temperature of the heating zone and the circumferential velocity of the nip rolls. A longitudinal/transverse ratio (distance between nip rolls/base width) was adjusted to be 3.3, the base temperature before the film enters the heating zone was set to 25° c, and the film was heated in the heating zone at the temperature described in Table 1 for one minute.

Heat Treatment Process B

While the obtained film was gripped by tenter clips, the film was subjected to the heat treatment by using a device which allows the film to pass through the heating zone. A contraction ratio in the width direction was controlled by adjusting a width of a rail. The base temperature before the film enters the heating zone was set to 25° c and the film was heated in the heating zone at the temperature described in Table 1 for one minute.

Heat Treatment Process C

Heat Treatment Process C was performed in the same manner as Heat Treatment Process A other than the heating time of 60 minutes different from the heating time of Heat Treatment Process A.

(Evaluation of Transparent Polymer Film)

The respective transparent polymer films thus obtained were evaluated. The results are shown in Table 1 below.

The slow-phase axis of Re of the film was observed in the width direction in Examples, and observed in the transport direction of the film in Comparative Examples. The variation (variation of values measured at five portions) of Re and Rth evaluated based on the above-mentioned method was at most ±1 nm and at most ±2 nm, respectively, for all the samples. The fluctuation range in the direction of the slow-phase axis was below 1°.

TABLE 1

|  | Cellulous Acylate Type | Solvent | Additive | Dissolution Process | Film Forming Process Type | (285 × S + 1000) | Tc [° C.] | Melting Point [° C.] | Heat Treatment Process | Heat Treatment Temperature [° C.] | Contraction Ratio [%] | Film Extension [%] |
|---|---|---|---|---|---|---|---|---|---|---|---|---|
| Example 101 | A | A | A | A | A | 188 | 195 | 290 | A | 200 | 14 | 10 |
| Example 102 | A | B | A | A | A | 188 | 200 | 290 | A | 200 | 8 | 3 |
| Example 103 | A | B | A | A | A | 188 | 200 | 290 | A | 220 | 18 | 10 |
| Example 104 | A | B | A | A | A | 188 | 200 | 290 | A | 240 | 38 | 20 |
| Example 105 | A | A | A | A | B | 188 | 190 | 290 | A | 240 | 39 | 20 |
| Comparative Example 101 | A | A | A | A | A | 188 | 195 | 290 | A | 180 | 3 | 15 |
| Comparative Example 102 | A | A | A | A | A | 188 | 195 | 290 | A | 180 | 35 | 60 |
| Comparative Example 102-2 | A | A | A | A | A | 188 | 195 | 290 | A | 300 | — | — |
| Example 106 | A | A | A | A | A | 188 | 195 | 285 | A | 260 | 50 | 40 |
| Example 107 | A | A | A | A | A | 188 | 195 | 285 | B | 240 | 15 | 1 |
| Comparative Example 103 | A | A | A | A | A | 188 | 195 | 285 | B | 210 | 0 | 1 |

TABLE 1-continued

| | | | | | | | | | | | | | |
|---|---|---|---|---|---|---|---|---|---|---|---|---|---|
| Comparative Example 104 | A | A | A | A | A | 188 | 195 | 285 | B | 240 | 0 | 1 | |
| Example 108 | A | A | B | A | A | 188 | 190 | 285 | A | 240 | 58 | 60 | |
| Example 109 | A | A | B | A | B | 188 | 185 | 285 | A | 240 | 35 | 25 | |
| Example 110 | B | A | A | A | A | 159 | 155 | 290 | A | 240 | 32 | 25 | |
| Example 111 | B | A | A | B | A | 159 | 155 | 290 | A | 240 | 33 | 25 | |
| Example 112 | B | B | A | B | A | 159 | 155 | 290 | A | 240 | 32 | 25 | |
| Comparative Example 105 | (TAC A) | — | — | — | — | 188 | 185 | 285 | A | — | — | — | |
| Comparative Example 106 | (TAC A) | — | — | — | — | 188 | 185 | 285 | C | 240 | 38 | 25 | |
| Example 113 | (TAC A) | — | — | — | — | 188 | 185 | 285 | A | 240 | 45 | 60 | |
| Comparative Example 107 | (TAC B) | — | — | — | — | 188 | 190 | 285 | A | — | — | — | |
| Example 114 | (TAC B) | — | — | — | — | 188 | 190 | 280 | A | 240 | 35 | 25 | |
| Example 115 | A | A | A | A | A | 188 | | 290 | B | 210 | 4 | 3 | |

| | X-ray Diffractive Intensity | | | | | | | | Slow-Phase Axis Angle | |
|---|---|---|---|---|---|---|---|---|---|---|
| | $2\theta_2$ | | | $2\theta_4$ | | Haze [%] | Re Average [nm] | Rth Average [nm] | Sound Velocity [°] | Transport Direction [°] |
| | Io(Iam + Ic) | Half Value Width [°] | $Ic_2/IC_2$ | Position [°] | Half Value Width [°] | | | | | |
| Example 101 | 0.53 | 2.8 | 122 | 13.3 | 1.8 | 0.2 | 32 | −31 | 90 | 90 |
| Example 102 | 0.45 | 3.0 | 61 | — | — | 0.2 | 13 | −33 | 90 | 90 |
| Example 103 | 0.58 | 1.9 | 153 | 10.6 | 1.6 | 0.2 | 85 | −57 | 90 | 90 |
| Example 104 | 0.67 | 1.7 | 255 | 10.5 | 1.5 | 0.2 | 155 | −76 | 90 | 90 |
| Example 105 | 0.47 | 1.7 | 136 | 10.6 | 1.6 | 0.3 | 115 | 27 | 90 | 90 |
| Comparative Example 101 | 0.38 | 4.6 | 48 | — | — | 0.8 | 3 | 4 | 0 | 0 |
| Comparative Example 102 | 0.43 | 3.3 | 104 | 13.4 | 2.0 | 0.3 | 3 | 4 | 90 | 90 |
| Comparative Example 102-2 | — | — | — | — | — | — | — | — | — | — |
| Example 106 | 0.75 | 0.4 | 288 | 10.4 | 0.4 | 0.3 | 230 | −89 | 90 | 90 |
| Example 107 | 0.49 | 2 | 55 | 10.5 | 1.7 | 0.3 | 136 | −69 | 90 | 88 |
| Comparative Example 103 | 0.42 | 4.2 | 34 | — | — | 0.2 | 1 | 15 | 0 | 0 |
| Comparative Example 104 | 0.44 | 4.3 | 48 | 10.6 | 1.7 | 0.2 | 7 | −6 | 90 | 89 |
| Example 108 | 0.71 | 0.7 | 255 | 10.4 | 0.7 | 0.4 | 240 | −71 | 90 | 90 |
| Example 109 | 0.50 | 1.6 | 143 | 10.6 | 1.5 | 0.4 | 166 | 23 | 90 | 90 |
| Example 110 | 0.64 | 0.9 | 147 | 10.4 | 0.9 | 0.3 | 226 | −49 | 90 | 90 |
| Example 111 | 0.65 | 0.7 | 159 | 10.4 | 0.7 | 0.3 | 231 | −67 | 90 | 90 |
| Example 112 | 0.68 | 0.7 | 170 | 10.4 | 0.7 | 0.4 | 233 | −73 | 90 | 90 |
| Comparative Example 105 | 0.38 | 4.6 | 42 | — | — | 0.3 | 1 | 48 | 0 | 0 |
| Comparative Example 106 | 0.89 | 1.1 | 133 | 10.3 | 1.0 | 3.2 | 183 | −72 | 90 | 90 |
| Example 113 | 0.67 | 1.4 | 238 | 10.5 | 1.3 | 0.5 | 162 | −63 | 90 | 90 |
| Comparative Example 107 | 0.38 | 5.0 | 43 | — | — | 0.2 | 2 | 45 | 0 | 0 |
| Example 114 | 0.57 | 1.6 | 119 | 10.6 | 1.5 | 0.4 | 177 | 40 | 90 | 90 |
| Example 115 | 0.43 | 3.0 | 45 | 13.3 | 1.8 | 0.2 | 5 | 17 | 0 | 0 |

As shown in Table 1, by performing the heat treatment in accordance with the method of the invention, it is possible to manufacture a cellulous acylate film having a preferable X-ray diffractive intensity, having the low haze, improving both of an optical property and a dynamic property of matter. However, when the condition of the heat treatment does not fall within the range of the invention, it is difficult to manufacture the cellulous acylate film having a preferable X-ray diffractive intensity and the direction of the slow-phase axis is not preferable. Further, in Comparative Example 102-2, the film was molten and cut off in the course of transporting the film.

Example 151 to 154

(Re-extension of Film)

Both ends of the cellulous acylate film completing the heat treatment were gripped tenter clips and then the film was extended in the heating zone. The temperature of the heating zone, the extension ratio and evaluation of the obtained cellulous acylate film was shown in Table 2. The extension ratio was obtained by drawing gauge lines at regular intervals in a direction parallel to the transport direction of the film and then measuring the gauge lines before and after the extension.

Extension Ratio(%)=100×(interval of gauge line after extension−interval of gauge line before extension)/(interval of gauge line before extension)

TABLE 2

| | Heat Treated Film | Extension Temperature [° C.] | Film Extension [%] | X-ray Diffractive Intensity | | | | Moisture Absorption Ratio [%] | Haze [%] | Re Average [nm] | Rth Average [nm] |
|---|---|---|---|---|---|---|---|---|---|---|---|
| | | | | $Ic_2/Iam_2 + Ic_2$ | Half Value Width [°] | $Ic_4/(Iam_4 + Ic_4)$ | $Ic_{21}/Ic_{22}$ | | | | |
| Example 151 | Example 105 | 175 | 24 | 0.41 | 4.1 | 0.03 | 86 | 2.7 | 0.2 | 1 | 15 |
| Example 152 | Example 105 | 175 | 15 | 0.41 | 4.1 | 0.04 | 86 | 2.7 | 0.2 | 1 | 7 |
| Example 153 | Example 105 | 170 | 8 | 0.41 | 4.1 | 0.04 | 86 | 2.7 | 0.2 | 0 | 0 |
| Example 154 | Example 106 | 170 | 8 | 0.41 | 4.2 | 0 | 85 | 2.8 | 0.2 | 1 | 1 |

Comparative Example 108

A bi-refractive film was obtained by using TAC A in accordance with Example 5 of JP-A-5-157911. The angle formed by a direction of the in-plane slow-phase axis of the film and a direction in which the sound velocity becomes the maximum or the transport direction was 3°. Accordingly, the angle was not preferable. The range of fluctuation in the direction of the slow-phase axis was 8°, which was large. Further, in the non-uniformities (non-uniformities of measured value of five points) of Re and Rth, Re and Rth were ±25 nm and ±43 nm, which were large.

Comparative Example 109

A bi-refractive film was obtained in accordance with Example 1 of JP-A-2006-28346. The angle formed by a direction of the in-plane slow-phase axis and a direction in which the sound velocity becomes the maximum was 0°.

Example 201

(Manufacture of Laminating Retardation film)

The cellulous acylate film of the invention may be used as a retardation film itself. However, herein, by adhering the film using an adhesive in the roll-to-roll manner, the retardation film which controlled Rth/Re ratio was manufactured.

Fujitac T80UZ (manufactured by Fuji Photo Film Co., Ltd.) and the film of Example 110 were adhered to each other by using an adhesive. Then, Re and Rth were measured in the above-described method. The result was that Re was 225 nm and Rth was 0 nm. In addition, the angle formed by a direction of the in-plane slow-phase axis of the retardation film and the transport direction was 90°.

Examples 301 to 319, Comparative Examples 301 to 309

(Manufacture of Polarizer)

The obtained film was subjected to saponification treatment, thereby manufacturing a polarizer.

1) Saponification of Film

A film A and film B shown in Table 3 below were dipped in a 1.5 mol/L of NaOH aqueous solution (saponification solution) that was temperature-controlled at 55° C. for 2 minutes and then washed with water. After that, the films were dipped in a 0.05 mol/L sulfuric acid aqueous solution for 30 seconds and further passed through a water washing bath. Then, the films were subjected to air knife treatment three times to remove water and retained in a drying zone at 70° C. for 15 seconds to be dried, thereby manufacturing saponified films.

2) Manufacture of Polarizing Layer

According to Example 1 described in JP-A-2001-141926, the film was stretched in a longitudinal direction by giving difference in circumferential velocities to two pairs of nip rolls, thereby preparing a polarizing layer having a thickness of 20 μm.

3) Sticking

The polarizing layer thus obtained and the two films (film A and film B respectively, whose combination in respective Examples and Comparative Examples is shown in Table 3 below) selected from the saponified films were disposed so that the saponified surfaces of the film faced to the polarizing film and sandwiched the polarizing layer, and then stuck to each other by the use of a 3% PVA (PVA-117H, manufactured by KURARAY Co., Ltd.) aqueous solution as an adhesive in such a manner that the polarizing axis crossed perpendicularly to the longitudinal direction of the film using roll-to-roll process.

In Table 3, 'TAC B' indicates FUJITAC TD80UF (manufactured by Fujifilm corporation; moisture permeability=430 g/($m^2$·day) at 40° C. and a relative humidity of 90%) (80 μm in terms of thickness), 'polycarbonate' indicates Panlite C1400 (manufactured by TEIJIN CHEMICALS, Ltd.; moisture permeability=30 g/($m^2$·day) at 40° C. and a relative humidity of 90%) (80 μm in terms of thickness), 'COP1' indicates ARTON FILM (thickness: 80 μm, manufactured by JSR corporation; moisture permeability=30 g/($m^2$·day) at 40° C. and a relative humidity of 90%) (80 μm in terms of thickness), and 'COP2' indicates ZEONOR FILM (thickness: 100 μm, manufactured by ZEON; moisture permeability=0 g/($m^2$·day) at 40° C. and a relative humidity of 90%) (80 μm in terms of thickness).

In Comparative Example 304, the sticking was carried out by using a film which had been subjected to surface treatment replaced by corona treatment.

In Comparative Example 106, the sticking was not carried out as the cracking of the film was occurred at the sticking.

(Evaluation of Polarizer)

[Initial Polarization Degree]

The polarization degree of the polarizer was calculated according to the method described above. The result is shown in Table 3.

[After Storage Polarization Degree 1]

The film A side of the polarizer was stuck to a glass plate with an adhesive, and was left under conditions of 60° C. and a relative humidity of 95% for 500 hours and the polarization degree after the lapse of time (after storage polarization degree) was calculated according to the aforementioned method. The results are shown in Table 3 below.

[After Storage Polarization Degree 2]

The film A side of the polarizer was stuck to a glass plate with an adhesive, and was left under conditions of 90° C. and a relative humidity of 0% for 500 hours and the polarization degree after the lapse of time (after storage polarization degree) was calculated according to the aforementioned method. The results are shown in Table 3 below.

TABLE 3

| | Film A | Film B | Initial Polarization Degree [%] | After Storage Polarization Degree 1 [%] | After Storage Polarization Degree 2 [%] |
|---|---|---|---|---|---|
| Example 301 | Example 101 | TAC B | 99.9 | 99.9 | 99.9 |
| Example 302 | Example 102 | TAC B | 99.9 | 99.9 | 99.9 |
| Example 303 | Example 103 | TAC B | 99.9 | 99.9 | 99.9 |
| Example 304 | Example 104 | TAC B | 99.9 | 99.9 | 99.9 |
| Example 305 | Example 105 | TAC B | 99.9 | 99.9 | 99.9 |
| Example 306 | Example 106 | TAC B | 99.9 | 99.9 | 99.9 |

TABLE 3-continued

| | Film A | Film B | Initial Polarization Degree [%] | After Storage Polarization Degree 1 [%] | After Storage Polarization Degree 2 [%] |
|---|---|---|---|---|---|
| Example 307 | Example 107 | TAC B | 99.9 | 99.9 | 99.9 |
| Example 308 | Example 108 | TAC B | 99.9 | 99.9 | 99.9 |
| Example 309 | Example 109 | TAC B | 99.9 | 99.9 | 99.9 |
| Example 310 | Example 110 | TAC B | 99.9 | 99.9 | 99.9 |
| Example 311 | Example 111 | TAC B | 99.9 | 99.9 | 99.9 |
| Example 312 | Example 112 | TAC B | 99.9 | 99.9 | 99.9 |
| Example 313 | Example 113 | TAC B | 99.9 | 99.9 | 99.9 |
| Example 314 | Example 114 | TAC B | 99.9 | 99.9 | 99.9 |
| Example 315 | Example 151 | TAC B | 99.9 | 99.9 | 99.9 |
| Example 316 | Example 152 | TAC B | 99.9 | 99.9 | 99.9 |
| Example 317 | Example 153 | TAC B | 99.9 | 99.9 | 99.9 |
| Example 318 | Example 154 | TAC B | 99.9 | 99.9 | 99.9 |
| Example 319 | Example 154 | Example 154 | 99.9 | 99.9 | 99.9 |
| Comparative Example 301 | Polycarbonate | Polycarbonate | (Unmeasurable due to insufficient sticking property) | | |
| Comparative Example 302 | COP1 | COP1 | (Unmeasurable due to insufficient sticking property) | | |
| Comparative Example 303 | COP2 | COP2 | (Unmeasurable due to insufficient sticking property) | | |
| Comparative Example 304 | COP2 | COP2 | 99.9 | 99.9 | (Bubble generation) |
| Comparative Example 305 | Comparative Example 101 | TAC B | 99.9 | 99.9 | 99.9 |
| Comparative Example 306 | Comparative Example 103 | TAC B | 99.9 | 99.9 | 99.9 |
| Comparative Example 307 | Comparative Example 104 | TAC B | 99.9 | 99.9 | 99.9 |
| Comparative Example 308 | TAC B | TAC B | 99.9 | 99.9 | 99.9 |
| Comparative Example 309 | Comparative Example 109 | TAC B | 99.9 | 99.9 | 99.9 |

[Polarization Degree 3 with Lapse of Time]

The film A of the polarizing plate was adhered to the glass plate and was kept under the condition where the temperature is 60° C. and the relative humidity is 95% for 50 hours and the condition where the temperature is 90° C. and the relative humidity is 0% for 50 hours tobe subjected to tests for 10 cycles. Then, the polarization degree was measured. As shown in Example 301 to 319 and Comparative Example 305 to 308, the result was that the sample in which an extending direction of the polarizer and a direction the sound-wave propagation velocity becomes the maximum are parallel to each other did not vary after lapse of time. On the other hand, as shown in Comparative Example 309, the result was that in the sample in which an extending direction of the polarizer and a direction the sound-wave propagation velocity becomes the maximum are perpendicular to each other the polarization degree after lapse of time lowered to 87.1%.

(Mounting Assessment onto IPS Liquid Crystal Display Device)

When the polarizing plates of Example 315and Example 316 were mounted on IPS Liquid Crystal display device (32V High-Vision Liquid Crystal Television Monitor (W32-L7000), manufactured by Hitachi, Ltd.) instead of a polarizing plate mounted in advance, the property of viewing angle was improved. The improvement effect of the viewing angle property was better than that of Example 302. On the contrary, when the polarizing plates of Comparative Examples 305 to 309 were mounted thereon, the viewing angle property was not improved. Even when the viewing angle property was improved, the improvement was not sufficient.

INDUSTRIAL APPLICABILITY OF THE INVENTION

According to the invention, it is possible to provide a cellulous acylate film in which both of the optical property and the matter property are improved. In addition, it is possible to provide a cellulous acylate film satisfying the above-mentioned condition, showing large Re of the film, and being useful as a retardation film. Since the cellulous acylate film has proper moisture permeability, the film can be adhered to the polarizing film on line. Accordingly, the polarizing plate having excellent visibility and high productivity can be provided. In addition, the liquid crystal display having high-reliability can be provided. Consequently, the invention has high applicability.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 139566/2006 filed on May 18, 2006, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A cellulose acylate film, in which X-ray diffraction intensity satisfies Formulae (I) to (III) below and a half-value width of the peak at $2\theta_2$ is 3° or less:

$$0.40 \leq Ic/(Iam+Ic) \leq 0.85; \quad \text{Formula (I)}$$

$$Iam = I_1 + \{(I_3-I_1)/(2\theta_3-2\theta_1) \times (2\theta_2-2\theta_1)\}; \quad \text{Formula (II)}$$

and $$Ic = I_2 - Iam, \quad \text{Formula (III)}$$

wherein when it is assumed that θ is the Bragg angle, $2\theta_1$ indicates 2θ at which the intensity becomes the minimum in the 2θ range of 4° to 5°, $2\theta_2$ indicates 2θ at which the intensity becomes the maximum in the 2θ range of 5° to 10°, $2\theta_3$ indicates $2\theta$ at which the intensity becomes the minimum in the $2\theta$ range of 14° to 16°, $I_1$ indicates a diffractive intensity at $2\theta_1$, $I_2$ indicates a diffractive intensity at $2\theta_2$, and $I_3$ indicates a diffractive intensity at $2\theta_3$.

2. The cellulose acylate film according to claim 1, wherein there exists at least one peak in the $2\theta$ range between $2\theta_2$ and $2\theta_3$, the maximum peak in the $2\theta$ range between $2\theta_2$ and $2\theta_3$ exists at $2\theta_4$ in the $2\theta$ range of 10° to 12.5°, and a half-value width of the peak at $2\theta_4$ is less than 2°.

3. The cellulose acylate film according to claim 1, wherein the cellulose acylate film satisfies Formula (IV):

$$Ic_1/Ic_2 > 50, \quad \text{Formula (IV):}$$

wherein $Ic_1$ is Ic in a direction in which $I_2$ becomes the maximum, and $Ic_2$ is Ic in a direction perpendicular to the direction in which $I_2$ is the maximum.

4. The cellulose acylate film according to claim 1, wherein the haze is 3% or less.

5. The cellulose acylate film according to claim 1, wherein the in-plane retardation is in the range of 5 to 600 nm.

6. The cellulose acylate film according to claim 1, wherein an angle formed by a direction of an in-plane slow-phase axis and a direction in which a sound-wave propagation velocity becomes the maximum is in the range of 75° to 105°.

7. The cellulose acylate film according to claim 1, wherein the angle between the in-plane slow-phase axis direction and the transport direction is in the range of 80° to 100°.

8. A retardation film comprising at least one sheet of the cellulose acylate film according to claim 1.

9. A polarizing plate comprising at least one sheet of the cellulose acylate film according to claim 1.

10. The polarizing plate according to claim 9, wherein the cellulose acylate film is directly attached to the polarizing film.

11. A liquid crystal display device comprising at least one sheet of the cellulose acylate film according to claim 1.

* * * * *